US 6,568,416 B2

(12) United States Patent
Tucker et al.

(10) Patent No.: US 6,568,416 B2
(45) Date of Patent: May 27, 2003

(54) FLUID FLOW CONTROL SYSTEM, FLUID DELIVERY AND CONTROL SYSTEM FOR A FLUID DELIVERY LINE, AND METHOD FOR CONTROLLING PRESSURE OSCILLATIONS WITHIN FLUID OF A FLUID DELIVERY LINE

(75) Inventors: Jeffrey C. Tucker, Walla Walla, WA (US); Brian L. Andersen, 12078 Division S., Royal City, WA (US) 99357; Robert Mittelstadt, Moses Lake, WA (US)

(73) Assignee: Brian L. Andersen, Royal City, WA (US)

( * ) Notice: Subject to any disclaimer, the term of this patent is extended or adjusted under 35 U.S.C. 154(b) by 153 days.

(21) Appl. No.: 09/798,014

(22) Filed: Feb. 28, 2001

(65) Prior Publication Data

US 2002/0117214 A1 Aug. 29, 2002

(51) Int. Cl.⁷ .............................................. G05D 7/06
(52) U.S. Cl. ...................... 137/14; 137/486; 137/487.5; 137/557; 251/5; 700/284
(58) Field of Search ........................ 137/14, 486, 487.5, 137/557; 251/5, 30.01, 61.1; 700/282, 283, 284; 239/569

(56) References Cited

U.S. PATENT DOCUMENTS

| 4,050,669 A | * | 9/1977 | Brumm ........................... 251/5 |
| 4,386,626 A | | 6/1983 | Hehl ........................... 137/529 |
| 4,431,020 A | * | 2/1984 | Kowalski ..................... 137/110 |
| 4,561,701 A | | 12/1985 | Fujii et al. ..................... 303/119 |
| 4,612,950 A | | 9/1986 | Schmid-Welti ........... 137/116.5 |
| 4,662,598 A | | 5/1987 | Weingarten ..................... 251/5 |
| 4,862,914 A | | 9/1989 | Weingarten ................. 137/544 |
| 4,934,399 A | * | 6/1990 | Cho ............................. 137/14 |
| 4,961,441 A | * | 10/1990 | Salter ........................... 137/14 |
| 4,979,542 A | | 12/1990 | Mesenich .............. 137/625.65 |
| 5,158,230 A | * | 10/1992 | Curran ........................ 137/486 |
| D335,331 S | | 5/1993 | Weingarten ................ D23/248 |
| 5,383,646 A | | 1/1995 | Weingarten ................ 251/61.1 |

(List continued on next page.)

OTHER PUBLICATIONS

Powers Process Controls, "Powers 531—PLC, DCS, PC Control Backup Station", pp. 1–6.
Bermad, 700 Series, Hydraulic Diaphragm Control Valves, For automatic control of water supply systems, Feb. 28, 2001, Retrieved from the Internet: http://www.bermad.com/series/info0501.html; 6 pages.

(List continued on next page.)

Primary Examiner—Michael Powell Buiz
Assistant Examiner—Ramesh Krishnamurthy
(74) Attorney, Agent, or Firm—Wells St. John P.S.

(57) ABSTRACT

A fluid delivery and control system is provided for a fluid delivery line having elastic components. The system includes a pressure sensor, an electronically controlled valve, processing circuitry, and computer program code logic. The pressure sensor is operative to detect fluid pressure within a fluid delivery line. The electronically controlled valve includes an adjustable flow regulating aperture disposed in the line, interposed along a linear flow axis, and operative to regulate fluid flow through the line. The processing circuitry communicates with the pressure sensor and the electronically controlled valve. The computer program code logic is executed by the processing circuitry and is configured to generate an output signal. The output signal comprises an operating parameter of at least one of the pressure sensor and the electronically controlled valve to adjust flow capacity of the flow regulating aperture of the valve to dissipate pressure oscillations within the fluid delivery line. A method is also provided.

35 Claims, 16 Drawing Sheets

U.S. PATENT DOCUMENTS

| | | | | |
|---|---|---|---|---|
| 5,396,923 A | * | 3/1995 | Allen et al. | 137/487.5 |
| 5,460,196 A | * | 10/1995 | Yonnet | 137/12 |
| 5,464,064 A | | 11/1995 | Weingarten | 169/22 |
| 5,485,400 A | | 1/1996 | Warrior et al. | 364/550 |
| 5,509,448 A | | 4/1996 | Wilson et al. | 137/625.64 |
| 5,524,084 A | | 6/1996 | Wang et al. | 364/510 |
| 5,524,829 A | * | 6/1996 | Keim et al. | 137/853 |
| 5,555,005 A | | 9/1996 | Pagnon | 347/6 |
| 5,615,832 A | | 4/1997 | Price | 239/8 |
| 5,660,198 A | * | 8/1997 | McClaran | 137/10 |
| 5,662,137 A | | 9/1997 | Schegerin | 137/487.5 |
| 5,787,925 A | | 8/1998 | Ollivier | 138/489.5 |
| 5,860,447 A | | 1/1999 | Chu | 137/505.25 |
| 5,875,815 A | | 3/1999 | Ungerecht et al. | 137/505.25 |
| 5,918,622 A | | 7/1999 | Perez | 137/172 |
| 5,931,186 A | * | 8/1999 | Skoglund | 137/486 |
| 6,035,878 A | | 3/2000 | Adams et al. | 137/1 |
| 6,305,401 B1 | * | 10/2001 | Uehara et al. | 137/102 |
| 6,454,183 B1 | * | 9/2002 | Hedegaard | 239/155 |

OTHER PUBLICATIONS

Bermad, Model 718, Electric Positioning Control Valve, Feb. 28, 2001, Retrieved from the Internet: http://www.bermad.com/ModelPage.asp?SelectedModel=718%2D00, one page; and Description/Operation, Purchase Specification, Helpful Hints & Options, Control Diagram, In–Line Static Test Procedures, Start–Up Operation, http://www.bermad.com/ProductSheets/71800dsc.html; http://www.bermad.com/ProductSheets/71800prc.html; http://www.bermad.com/ProductSheets/71800hlp.html; http://www.bermad.com/ProductSheets/71800ctl.html; http://www.bermad.com/ProductSheets/71800tst.html; and http://www.bermad.com/ProductSheets/71800str.html, respectively, 6 pages.

Bermad 700 Series Control Valves Engineering Bulletin; 8 pages; Bermad, 4070 East Leaverton Court, Anaheim, CA 92807.

Bermad Control Valve Submittal Data; Model 718–03 Control Valve; 2 pages; Bermad, 4070 East Leaverton Court, Anaheim, CA 92807.

Nelson 800 Series Valves, Pressure Control, Product brochure 800P_con–1; 1 sheet, printed both sides; Nelson Irrigation Corporation, Rt. 4, Box 169 Airport Road, Walla Walla, WA 99362.

Nelson 800 Series Control Valves, Product brochure CV–6, Oct. 1999, with insert page from Nelson 800 Series Control Valve Resource Manual on Three–Way Pressure Control–Reducing Operating Logic (Jan. 1996); Nelson Irrigation Corporation.

Powers Process Controls, Powers 535 1/4 DIN Process Controller; Product manual PS535 V3, 11 pages (Dec. 1997); Powers Process Controls, a unit of CRANE Co., 3400 Oakton St., Skokie, IL 60076.

* cited by examiner

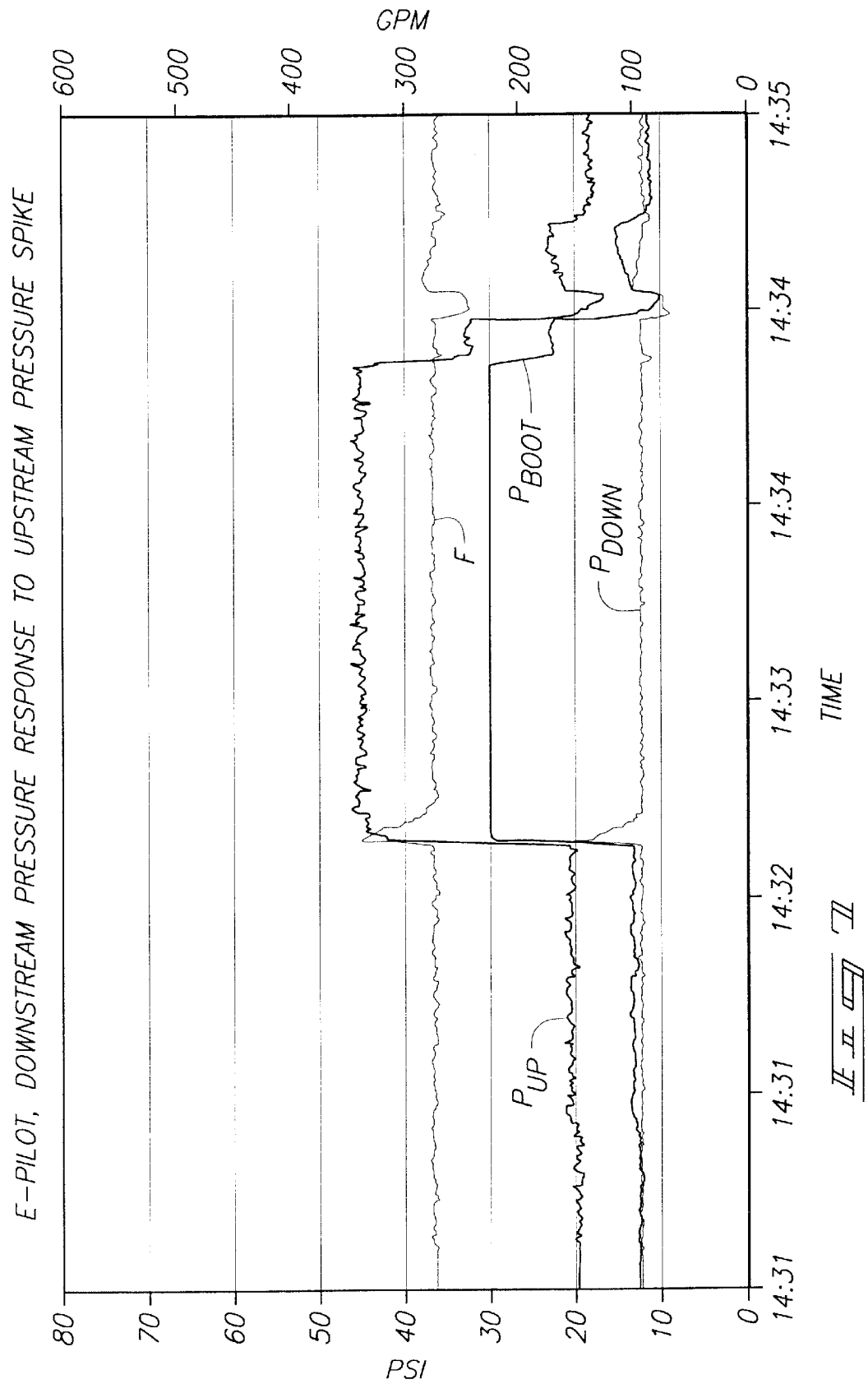

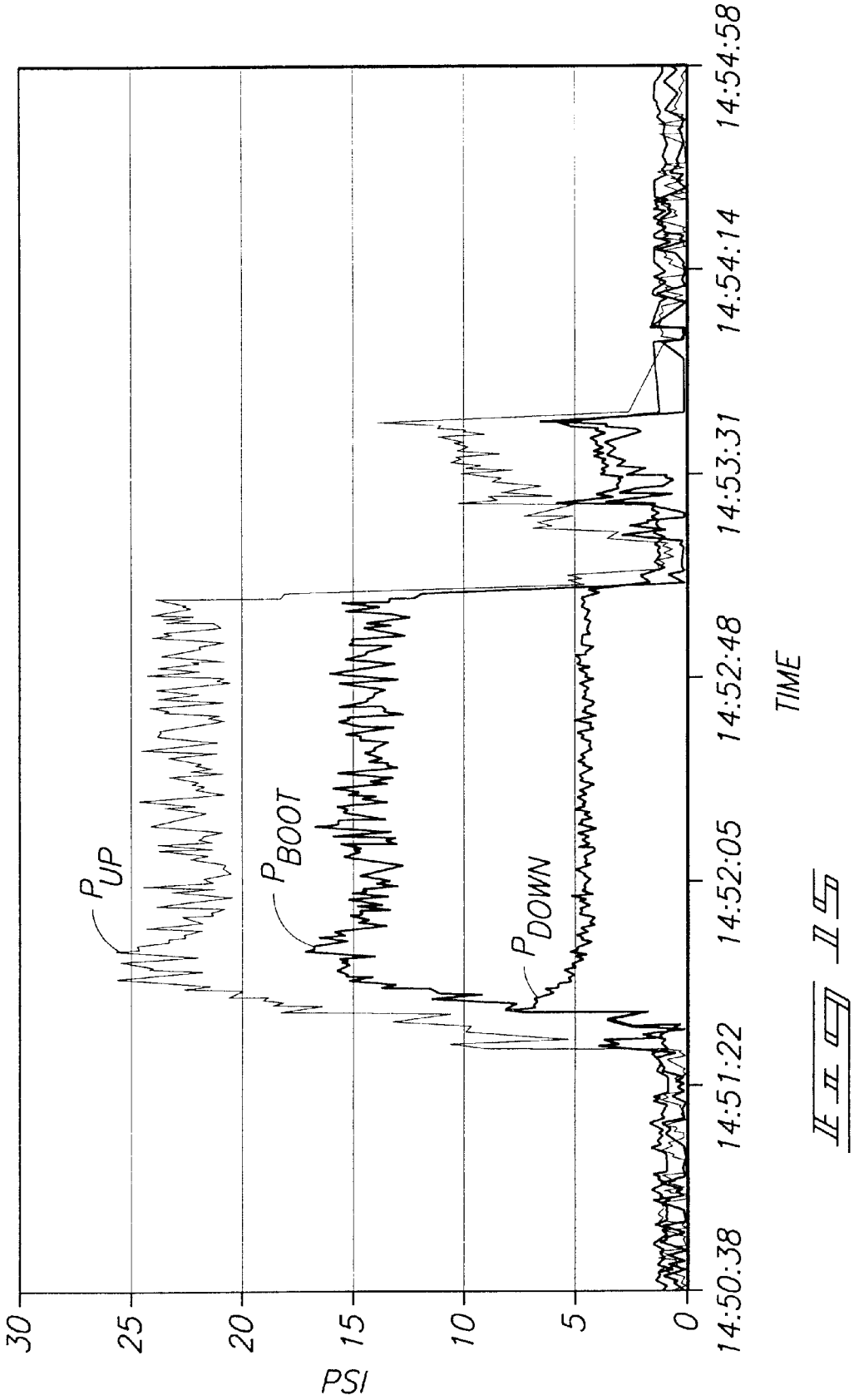

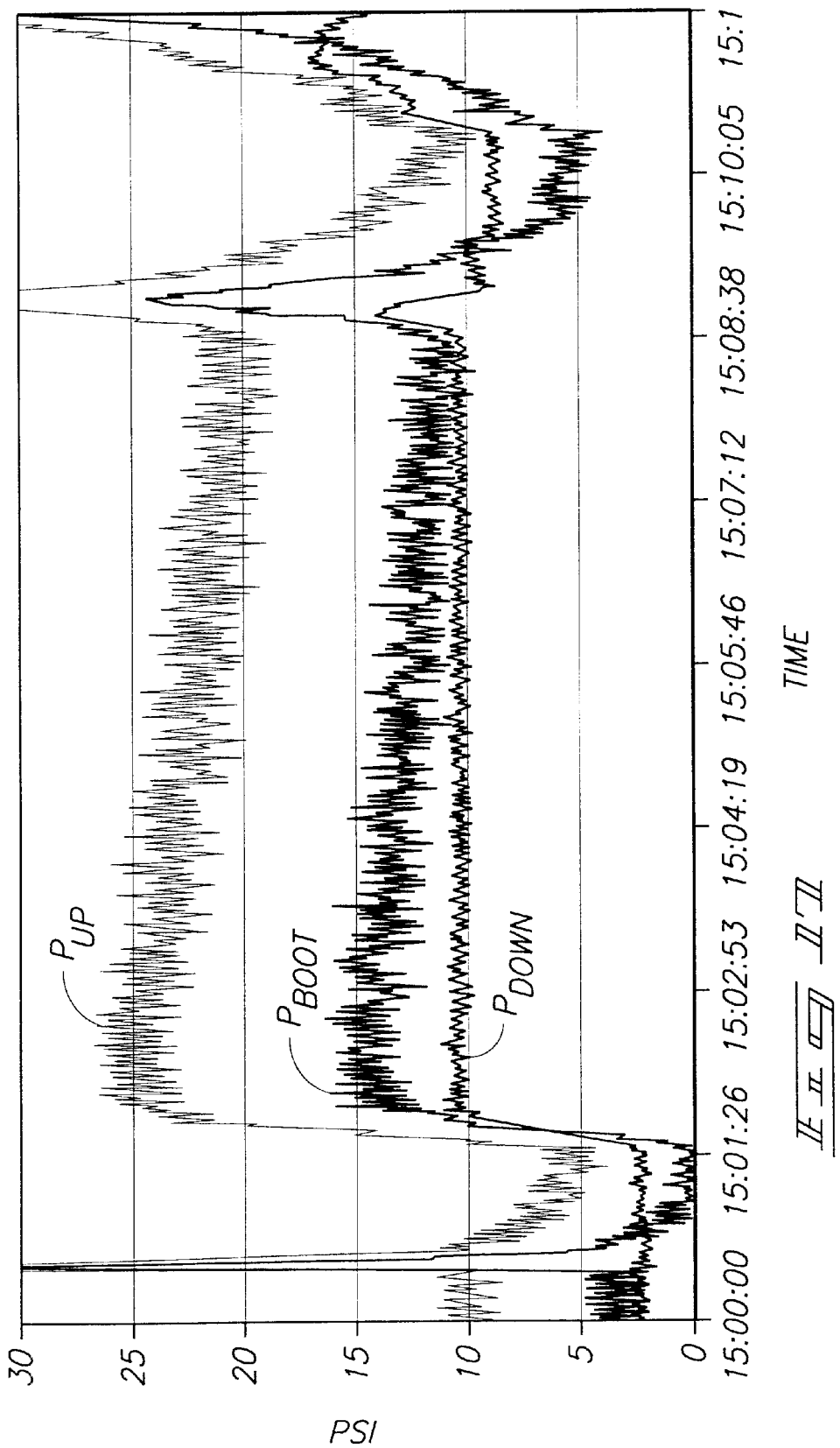

FLUID FLOW CONTROL SYSTEM, FLUID DELIVERY AND CONTROL SYSTEM FOR A FLUID DELIVERY LINE, AND METHOD FOR CONTROLLING PRESSURE OSCILLATIONS WITHIN FLUID OF A FLUID DELIVERY LINE

TECHNICAL FIELD

The invention pertains to fluid delivery systems. More particularly, this invention relates to fluid flow and pressure regulation systems including valves, valve control systems, irrigation flush systems, pressure relief systems, and controlled fluid delivery nozzles.

BACKGROUND OF THE INVENTION

Significant advances have recently been developed in the field of agricultural irrigation. More particularly, increases in water and energy costs coupled with an improved understanding of crop-water relations has led to an increase in demand for precision irrigation management techniques. Because of this demand for precision irrigation management techniques, there has been a movement to develop low volume-high frequency irrigation systems. For example, a drip irrigation system, also referred to as trickle irrigation, is one example of a low volume-high frequency irrigation system.

A drip irrigation system provides several advantages over other types of irrigation systems, such as flood irrigation systems, furrow irrigation systems, and many sprinkler-based irrigation systems. A well designed and properly maintained drip irrigation system can realize a very uniform fluid application over a field, with variations on the order of less than ten percent across the field. Accordingly, a grower can achieve greater control over the quantity of water delivered to a crop in the field in order to more precisely meet known water requirements for the crop, and to maintain a proper balance between soil moisture and aeration. Additionally, water-soluble fertilizers can be carefully metered, or "spoon-fed" to the crop using a drip irrigation system because the drip irrigation system can deliver fluids (and fertilizer) at precisely the rate and location required by the crop which corresponds to a growth stage of the crop. Even furthermore, careful metering of fluid including water, fertilizer, and pesticide can decrease disease and weed pressure on crops, as well as lower energy requirements and reduce environmental impact.

One form of drip irrigation system uses drip-tape. Drip tape is a thin-walled, polyethylene product that is usually buried at a nominal depth within a crop bed, for the case of row crops. Alternatively, the drip tape can be buried adjacent to a tree or vine row in orchards and vineyards. One distinguishing feature of drip tape is that drip tape employs a turbulent flow path between a main flow channel, or supply tube, and an emitter, or outlet. Such feature results in a consistent, definable relationship between discharge and pressure. However, drip tape is not pressure compensating. Therefore, great care and precision should be exercised in the design phase of an irrigation project in order to ensure that pressure variations do not exceed certain defined criteria.

As a result, to ensure such precision, fields are typically mapped using a survey grade global positioning system (GPS) in order to develop accurate topographic maps from which an irrigation system is then designed. As an example of the importance in developing an accurate topographic map, a design error of 1 psi will result from having an elevation error of 2.3 feet, which could lead to a 10% error in flow. Such errors may become compounded when integrated over large areas of a field. The operating pressure within drip tape is limited to a narrow range, which rarely exceeds 12 psi, and is seldom lower than 4 psi. It follows that the lower the operating pressure the more important the accuracy of design calculations. Accordingly, such a design error will have a significant effect on the operating pressure within a drip tape.

For most regions where crops are grown and irrigated, crops are rotated from field to field in order to break cycles of plant diseases, and to maintain soil tilth and fertility. Because of the need to rotate crops, many growers who wish to use drip irrigation systems need to implement portable or "temporary" drip irrigation systems that can be moved from field to field. Typically, these systems consist of above-ground components that can be re-used each year, as well as adapted to changes in irrigation system design. However, drip tape from such systems is discarded each year. Furthermore, design changes are usually necessary to accommodate changes in topography, water supply and field size. In contrast to the disposable drip tape, portable and reusable components from such systems include sand media filters for water treatment, PVC fittings, control valves, control wire and "lay-flat" tubing.

Pressure control is principally achieved within a field using control valves. As a control element, control valves regulate pressure by controlling the flow rate into or out of a portion of the delivery system where regulation is required. A "main" control valve is typically located near the water supply and regulates downstream pressure of the flow to the main line. The main control valve also serves the purpose of sustaining a minimum pressure on the upstream side to properly operate the filtration equipment. A "zone" control valve provides secondary control and allows for the precise regulation of pressure at a "zone". A "zone " is understood to refer to an irrigated block within the field, and thereby being supplied by a single distribution line or sub-main line within a multiple zone irrigation system. Operation of the irrigation system is typically automatic and is accomplished through a centralized programmable controller for zone valve operation. Zone control valves, in this application, regulate pressure from a range of 17 to 30 psi, on the supply side, down to a zone pressure of approximately 11.5 to 13.0 psi, depending on the design requirements.

One exemplary control valve is the Nelson 800 Series control valve sold by Nelson Irrigation Corporation, of Walla Walla, Wash. Such control valve employs a control volume and an expandable and retractable "sleeve" or "boot" diaphragm, positioned and seated within the valve body about the main flow path. The sleeve acts as a throttling element as the control volume is allowed to expand or retract, modulating flow through the valve. Such control valves are known as self-directing control valves, where the force necessary to position the throttling element is derived from the fluid being regulated. The Nelson 800 Series control valve is unique in its design in that it employs internal struts to maintain the sleeve in good throttling position, even at low flows. This is known as proportional throttling. The flow path through the valve keeps streamlines relatively uniform and parallel, minimizing friction loss due to turbulence. Due to the low overall operating pressures of drip irrigation systems, minimizing friction loss is important. Competitive valves, employing alternative throttling methods, create greater turbulence and friction loss and do not provide the same flow control. The loss coefficient depends primarily on the shape of the valve, which determines the degree of flow separation and generation of additional turbulence. Filling and draining of the control volume is governed by a mechanical pressure regulating pilot.

Mechanical pilots are typical to self-directing pressure regulating valves in agricultural irrigation. In order to reduce flow through the valve and therefore lower downstream pressure, pressurized water from upstream of the valve is allowed to pass to the control volume through the pilot. Conversely, in order to increase the downstream flow and raise downstream pressure, water from the control volume is allowed to vent to atmosphere back through the pilot. A set point, or regulated downstream pressure, is determined by a reference load. A spring within the mechanical pilot provides the reference load, and fluid pressure, both upstream and downstream, is in hydraulic communication with the mechanical pilot in a scheme known as "three-way logic". The sensitivity of the pilot is determined largely by the spring constant and by the size of the orifice regulating fluid flow into the pilot body. In operation, the balance of force between the spring reference load and the diaphragm determines the position of the pilot shaft and, therefore, which ports will open. Such control valves represent the current state of the art in agricultural irrigation, and work relatively well for most applications where precise pressure regulation is not a requirement.

However, with the classical mechanical pilot, there are a number of potential sources where accuracy and precision may be lost. First, inertia can cause a resistance to movement of the structural element that is responsible for directing fluid into and out of a control volume sleeve for a mechanical pilot system. Secondly, hysteresis of the mechanical portions of a mechanical pilot creates different operating points, depending on the direction of approach. Thirdly, mechanical fatigue of the spring within the mechanical pilot can be responsible for varying the reference load. Finally, temperature effects on the spring within the mechanical pilot can be responsible for varying the reference load. It is understood that the third and fourth cases can lead to a change in the relationship between an applied force, such as compression of the spring, and a change in length of the spring. This relationship is mathematically modeled and referred to as Hook's Law. Such inherent limitations cause pressure set points to vary throughout the irrigation season by as much as 2 or 3 psi.

Lay-flat tubing comprises an above-ground conduit by which water is transmitted from a pump and sand media filter to drip tape. Lay-flat tubing is relatively easy to install, retrieve, store and transport, making it one preferred method of distributing water within a field. Lay-flat tubing is typically constructed of 3-ply polyester yarns that are sandwiched between a vinyl tube and a cover. The yarns, tube and cover are simultaneously extruded together, forming the lay-flat tubing.

One problem with lay-flat tubing results because lay-flat tubing is not completely rigid and, therefore, it expands and contracts in response to pressure changes within a transmission line. In response to such expansion and contraction due to pressure changes, lay-flat tubing stores and releases energy. Such response can result in transmission of pressure waves throughout the distribution lines of an irrigation system, causing control valves to react accordingly, and in turn causing line pressure to continuously cycle up and down. Pressure waves within an irrigation system are initiated by sudden changes in flow velocity, usually caused by the reaction of a control valve. These conditions can be exacerbated by the presence of entrapped air. Typical pressure oscillations can have a period ranging from 3–4 seconds to a minute or more. This situation prevents the irrigation system from reaching a "steady-state" condition. However, it is important to reach a steady-state condition in order to realize uniform fluid flow to various portions within a field, as the field is being irrigated and, possibly, fertilized.

Additionally, for irrigation systems of sufficient size and scale, phenomenon such as dead time and lag time become important issues. Dead time is a delay in response due to the time it takes for fluid to flow from one point to another. Lag time is a period of time over which a response occurs and is additive to the dead time. For the mechanical pilot, when a corrective action occurs at the control valve, dead time and lag time can lead to over-corrective changes in the control volume and, therefore, the position of the throttling element. The mechanical pilot is susceptible to this as the control volume is in continuous hydraulic communication with a source of flow (typically upstream) during the corrective action.

Accordingly, field scale irrigation systems are largely designed using steady-state flow theory. Moreover, pressure settings for control elements within a given system design have been calculated using steady-state theory based on a particular design flow. However, as discussed above, irrigation systems may include non-rigid, or elastic, components, such as lay-flat tubing, and such steady-state conditions may be difficult, if not impossible, to realize. More particularly, the interaction and reaction of control valves in response to pressure waves propagating through the main line and sub-main portions, or lines, of an irrigation system prevents the prompt realization of a steady-state system. Such oscillation prevents control valves within an irrigation system from settling down to a steady-state flow and pressure regime. A normal, steady fluid flow regime is generally necessary in order to realize a proper distribution of moisture to crops in a field.

Hence, pressure control for most agricultural irrigation systems has traditionally been realized using such a mechanical pilot and control valve. Pressure control has been attempted for both downstream pressure regulation as well as for upstream pressure sustaining.

In industries outside of agricultural irrigation, such as in manufacturing or water-works, where fluid pressure regulation is often required, advances have been made in the area of feedback control to improve the performance of pressure regulating control valves. Specifically, the pressure of the fluid being regulated is continuously monitored and deviations from the set point cause a controller to re-position the throttling element to attain the proper fluid pressure. In feedback control theory, one method, commonly known as PID control, causes the corrective signal to be a function of the measured error. This method has been successfully applied to numerous process control loops including pressure regulation. However, numerous factors prohibit the adoption of these commercially available systems within agricultural irrigation and, specifically, drip irrigation. The most important factor is cost, as it is necessary for the agricultural producer to minimize production costs to be profitable. Therefore, the cost must be competitive with existing irrigation technology. Secondly, the flow control at low pressures and pressure loss characteristics desired are generally not present with valve technology from the aforementioned industries. Thirdly, the size, weight and physical dimensions of valve technology from these industries also make it impractical for many agricultural applications. Moreover, it is desirable that the technology be compatible with existing irrigation controllers, consuming minimal power. Lastly, it is desirable that intelligent control features be available to recognize unsteady flow conditions, such as pressure oscillations within the irrigation system, and to take corrective action.

Accordingly, improvements are needed in the way fluid is delivered and fluid pressure is controlled, particularly where an irrigation system includes non-rigid or elastic components.

SUMMARY OF THE INVENTION

An electronic control system and valve are provided for use with irrigation systems that have elastic components or have sufficient length that fluid compressibility introduces elasticity into an irrigation system as well as in the case where there is entrapped air and/or significant elevation changes in the irrigation system. Control of fluid pressure and steady state flow have previously been difficult to realize for such systems.

According to one aspect, a fluid delivery and control system is provided for a fluid delivery line having elastic components. The system includes a pressure sensor, an electronically controlled valve, processing circuitry, and computer program code logic. The pressure sensor is operative to detect fluid pressure within a fluid delivery line. The electronically controlled valve includes an adjustable flow regulating aperture disposed in the line, interposed along a linear flow axis, and operative to regulate fluid flow through the line. The processing circuitry communicates with the pressure sensor and the electronically controlled valve. The computer program code logic is executed by the processing circuitry and is configured to generate an output signal. The output signal comprises an operating parameter of at least one of the pressure sensor and the electronically controlled valve to adjust flow capacity of the flow regulating aperture of the valve to dissipate pressure oscillations within the fluid delivery line.

According to another aspect, a fluid flow control system is provided, including a pressure sensor, an electronically controlled flow regulating valve, and a processor. The pressure sensor detects fluid pressure within a fluid delivery line. The electronically controlled flow regulating valve is provided in the line to impart a substantially linear flow axis and is operative to regulate fluid flow through the line. The processor communicates with the pressure sensor and the electronically controlled flow regulating valve, with the sensor generating a PID feedback control signal. The processor is operative to regulate fluid flow through the valve to dampen out pressure oscillations in the line.

According to yet another aspect, a fluid flow control system is provided, including a pressure sensor, a primary control valve, an auxiliary fluid delivery line, an auxiliary control valve, and a processor. The pressure sensor is configured to detect fluid pressure within a primary fluid delivery line. The primary control valve is provided in the primary fluid delivery line and is operative to regulate fluid flow through the primary fluid delivery line. The auxiliary fluid delivery line extends between the primary control valve and the fluid delivery line. The auxiliary fluid delivery line is operative to deliver fluid between the primary control valve and the fluid delivery line to controllably adjust a throttling element of the primary control valve. The auxiliary control valve is provided in the auxiliary fluid delivery line and is operative to regulate fluid flow through the auxiliary secondary primary fluid delivery line. The processor communicates with the pressure sensor and the auxiliary control valve. The processor is operative to controllably adjust the throttling element of the primary control valve by regulating operation of the auxiliary control valve to deliver fluid between the primary control valve and the fluid delivery line via the auxiliary fluid delivery line.

According to yet even another aspect, a method is provided for controlling pressure oscillations within fluid of a fluid delivery line. The method includes: providing an electronically controlled valve disposed within a fluid delivery line and a pressure sensor communicating with the fluid delivery line; detecting fluid pressure within the fluid delivery line using the pressure sensor; and controllably regulating the electronic valve in response to the detected fluid pressure to regulate fluid flow through the line; wherein controllably regulating the electronic valve comprises controllably generating an output signal including an operating parameter of at least one of the pressure sensor and the electronic valve to regulate operation of the valve so as to dissipate pressure oscillations within the fluid delivery line.

BRIEF DESCRIPTION OF THE DRAWINGS

Preferred embodiments of the invention are described below with reference to the following accompanying drawings.

FIG. 7 is a plot of experimental data depicting downstream pressure response to an upstream pressure spike using the experimental test configuration of FIG. 6.

FIG. 12 is a simplified schematic diagram illustrating another experimental test configuration having an electronic pilot and used to generate the plot of FIG. 13.

FIG. 13 is a plot of experimental data depicting flow, upstream pressure, downstream pressure, and boot pressure for the test configuration of FIG. 12 and illustrating an electronic pilot functioning in only a downstream pressure regulating capacity.

FIG. 14 is a plot of experimental data depicting upstream pressure, downstream pressure, and boot pressure for a boot control valve having a mechanical pilot for a test configuration similar to that shown in FIG. 12, but omitting the mechanical pilot-controlled valve, and showing performance from start-up at zero flow to a designated flow rate.

FIG. 15 is a plot of experimental data depicting upstream pressure, downstream pressure, and boot pressure for the test configuration of FIG. 14 having an electronic boot control valve controlled according to the present invention and showing pressures from start-up at zero flow to an increase in flow rate.

FIG. 17 is a plot of experimental data depicting upstream pressure, downstream pressure, and boot pressure for the electronic boot control valve in the test configuration of FIG. 14, and illustrating pressures resulting from performance of the electronic pilot upon a change from a set point of 3 psi to a set point of 10 psi.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to preferred embodiments of Applicant's invention. While the invention is described by way of preferred embodiments, it is understood that the description is not intended to limit the invention to these embodiments, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
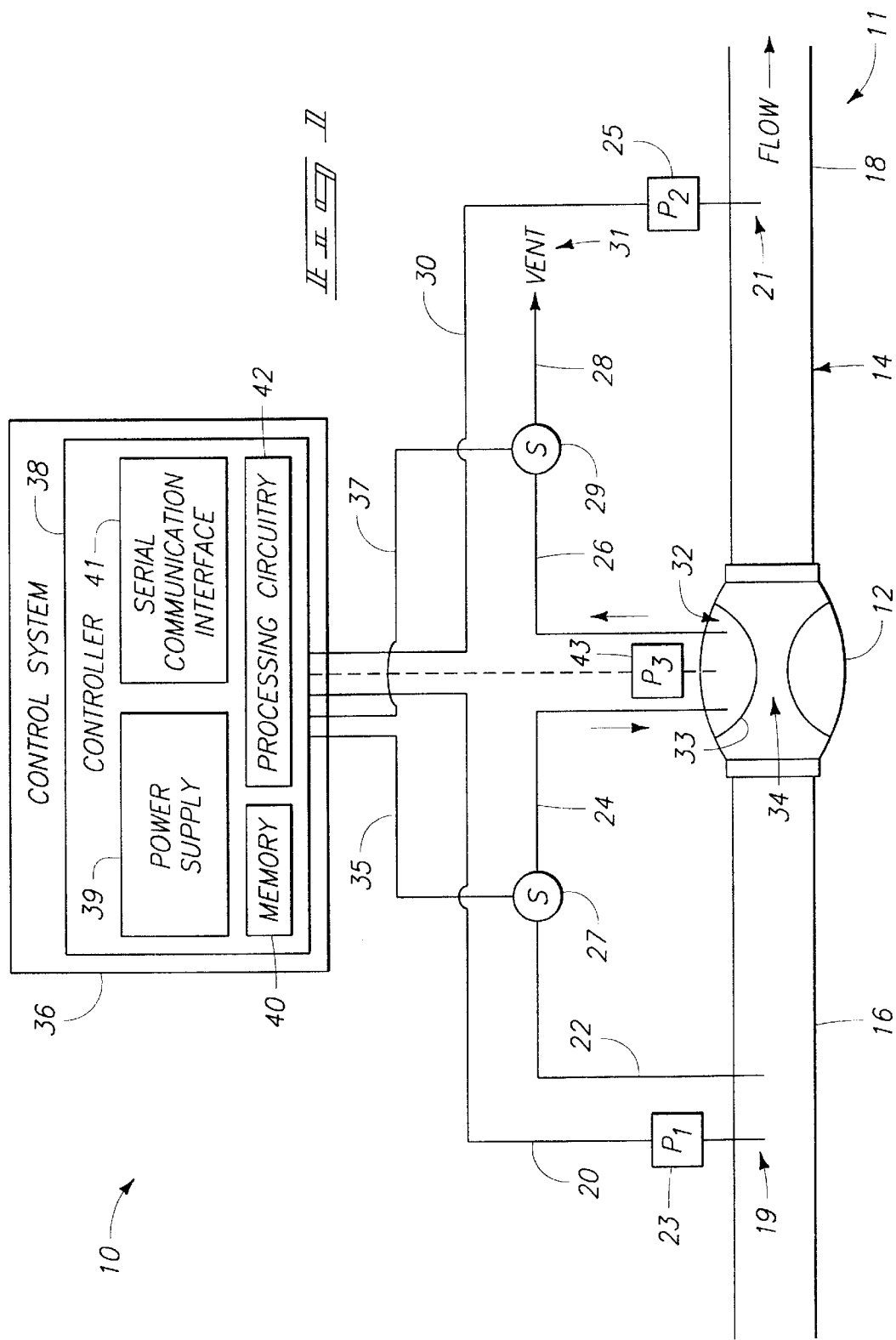
FIG. 1 is a simplified schematic and block diagram of an electronic fluid valve and control system according to one aspect of the invention for regulating downstream pressure with two solenoid valves and a discharge vent to atmosphere.

FIG. 1 is a simplified block diagram of an electronic fluid valve and control system 10 within an irrigation system 11 of an agricultural field. System 10 comprises an electronic flow control valve 12 disposed within a fluid delivery line, or flow pipe, 14, between an upstream line 16 and a downstream line 18. An upstream fluid pressure port 19 communicates with an upstream fluid pressure sensor 23, and a downstream pressure port 21 communicates with a downstream fluid pressure sensor 25. An upstream fluid pressure input signal line 20 delivers an upstream fluid pressure input signal from fluid pressure sensor 23 to a valve control system 36. Similarly, a downstream fluid pressure input signal line 30 delivers a downstream fluid pressure input signal from fluid pressure sensor 25 to valve control system 36.

An electronic, two-way solenoid valve 27 is disposed between a pair of valve boot control volume fluid delivery lines 22 and 24 for delivering fluid from upstream line 16 to a boot control volume 32 of a boot 33 of valve 12. Another electronic, two-way solenoid valve 29 is disposed between a pair of valve boot control volume discharge lines 26 and 28. Discharge line 28 is vented to a relatively low pressure location, such as to atmospheric pressure outside of the irrigation system lines 14.

Valve 12 comprises an elastic rubber boot, or sleeve, 33 which defines annular boot control volume 32. By increasing the volume of fluid present within control volume 32 via opening of solenoid 27, the size or cross-sectional diameter of an adjustable flow regulating annular aperture, or orifice, 34 is controllably defined in response to opening and closing of solenoids 27 and 29 via control system 36. Aperture 34 is interposed along a linear flow axis of line 14 to provide a substantially linear flow axis through valve 12, about a central core 43 (see FIG. 2) of valve 12.

Solenoids 27 and 29 cooperate to regulate flow into and out of control volume 32 of boot 33, respectively, in response to control signals generated by control system 36. In one case, solenoids 27 and 29 completely open and close respective fluid flow paths. Solenoid 27 regulates flow of fluid between an upstream source of pressurized fluid from upstream line 16 and control volume 32. Solenoid 29 regulates flow of fluid between control volume 32 and a point of discharge, or vent, 31 to atmosphere. One or both of pressure sensors, or transducers, 23 and 25, each provided in fluid or hydraulic communication with fluid being regulated, generates an input signal to control system 36. In one case, proportional integral derivative (PID) control is implemented by control system 36, as illustrated with reference to FIG. 5 below.

As shown in FIG. 1, an alternative configuration for system 10 includes a fluid pressure sensor 43, similar to sensors 23 and 25. Pressure sensor 43 is configured to measure pressure within boot control volume 32 of boot 33. An output signal from pressure sensor 43 is received within controller 38. It is understood that controller 38 further includes an analog-to-digital converter such that pressure sensors 23, 25 and 43 can comprise analog sensors and wherein the output signals from such respective sensors can be converted to digital signals that are utilized and processed by processing circuitry 42 of controller 38.

Valve and control system 10 is capable of performing a number of functions based upon pressure control requirements that need to be realized by irrigation system 11. The following three functions can be realized: downstream pressure regulation; upstream pressure sustaining; and a combination of downstream pressure regulation and upstream pressure sustaining. In one implementation, the invention as configured for any of the previous three functions can also perform an on/off control in response to control signals received by a master irrigation controller that sends an input signal to control system 36 of valve and control system 10.

Control system 36 is configured to provide a primary control mechanism for regulating line pressure within irrigation system 11 via intelligent control of fluid flow into and out of control volume 32. Line pressure upstream of valve 12 can be sustained at a minimum value, as well as line pressure downstream of valve 12. By controllably increasing and decreasing the fluid volume of control volume 32, flow regulating orifice 34 is adjusted in diameter so as to provide a throttling element within valve 12. Alternatively, a mechanical throttle valve can be used in place of boot 33. Either way, the resulting throttling element is controllably positioned via control system 36 to realize pressure control of the main body of fluid flow at the set point or set points which define a pressure at sensors 23 and/or 25.

Figure 2:
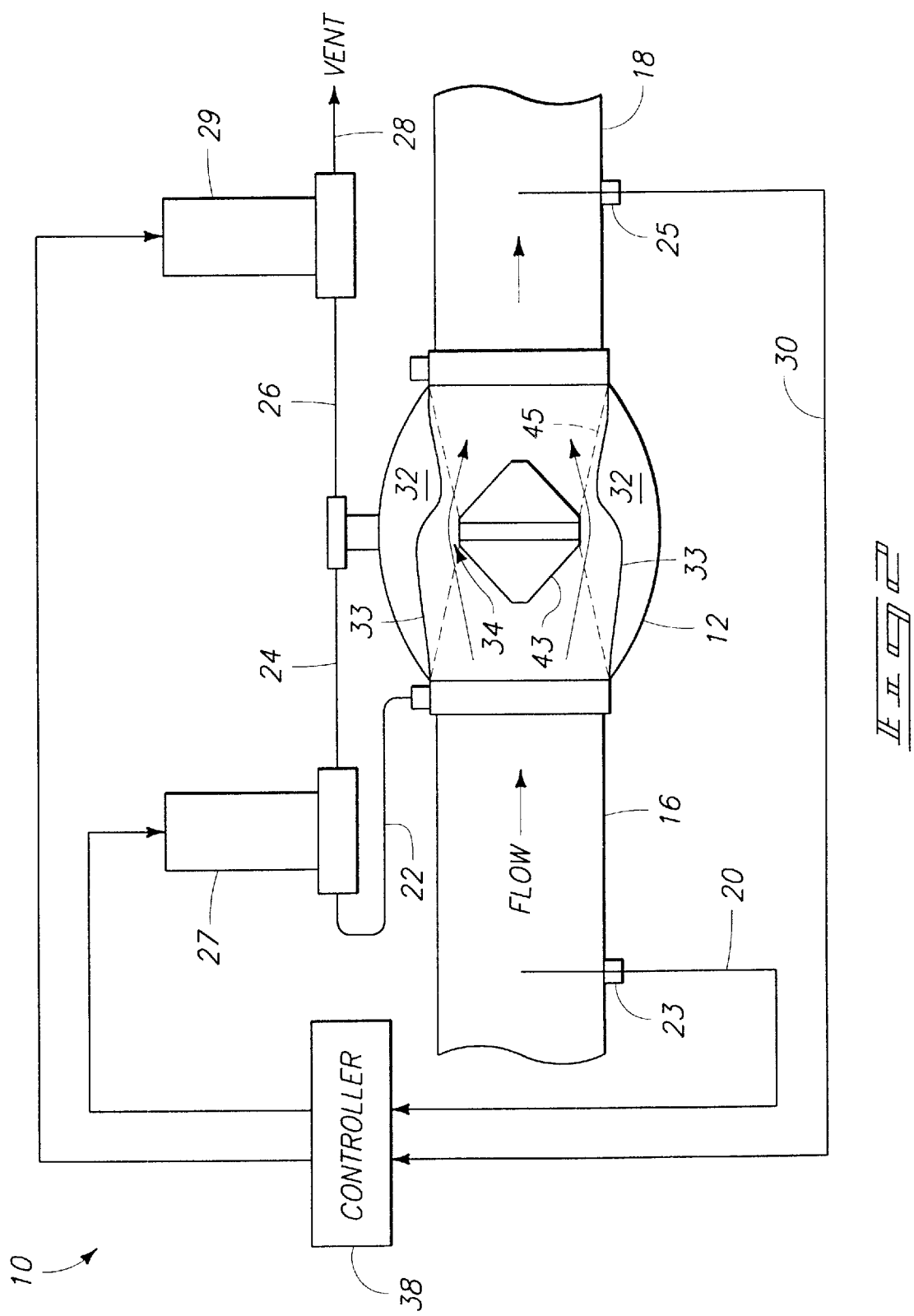
FIG. 2 is a simplified schematic diagram of the system of FIG. 1.

As shown in FIG. 2, valve 12, comprising a Nelson 800 Series control valve, is shown in greater detail than that depicted in FIGS. 1, 3–4, and 6. According to one implementation, valve 12 comprises a Nelson 800 Series control valve manufactured by Nelson Irrigation Corporation, of Walla Walla, Wash., as referenced below. However, it is understood that other valve constructions can be utilized including those providing for a cylindrical flow orifice, in contrast to the annular orifice provided by the Nelson 800 Series control valve.

More particularly, one construction of valve 12 comprising a Nelson 800 Series valve includes a central solid core 43 about which fluid flows and a perforated cage 45 against which flexible boot 33 is engaged so as to restrict or close fluid flow through valve 12. Cage 45 comprises a pair of cage members which are joined together about a center seat in a manner that provides core 43 co-axially within valve 12. Accordingly, core 43 is axially aligned within the valve 12 in relation to the fluid flow line extending from either direction of valve 12. An annular area is provided radially between the conical portions of core 43, and flexible boot, or sleeve, 33 is moved toward and away from cage 45 in order to regulate flow through valve 12. Core 43 provides a center barrier that cooperates with boot 33 when valve 12 is shut so as to completely shut off flow. Accordingly, flow regulating aperture, or orifice, 34 comprises an annular aperture about core 43. Such annular aperture 34 is provided in relation to valve 12 and the line extending from either side of valve 12 so as to be interposed along a substantially linear flow axis. More particularly, such aperture is interposed along a linear flow axis of the surrounding fluid flow line so as to provide a substantially linear flow axis through valve 12 as fluid is diverted slightly from a purely axially line as such fluid moves about core 43. However, fluid flow lines through valve 12 still move in a somewhat substantially linear fashion through valve 12.

Figure 3:
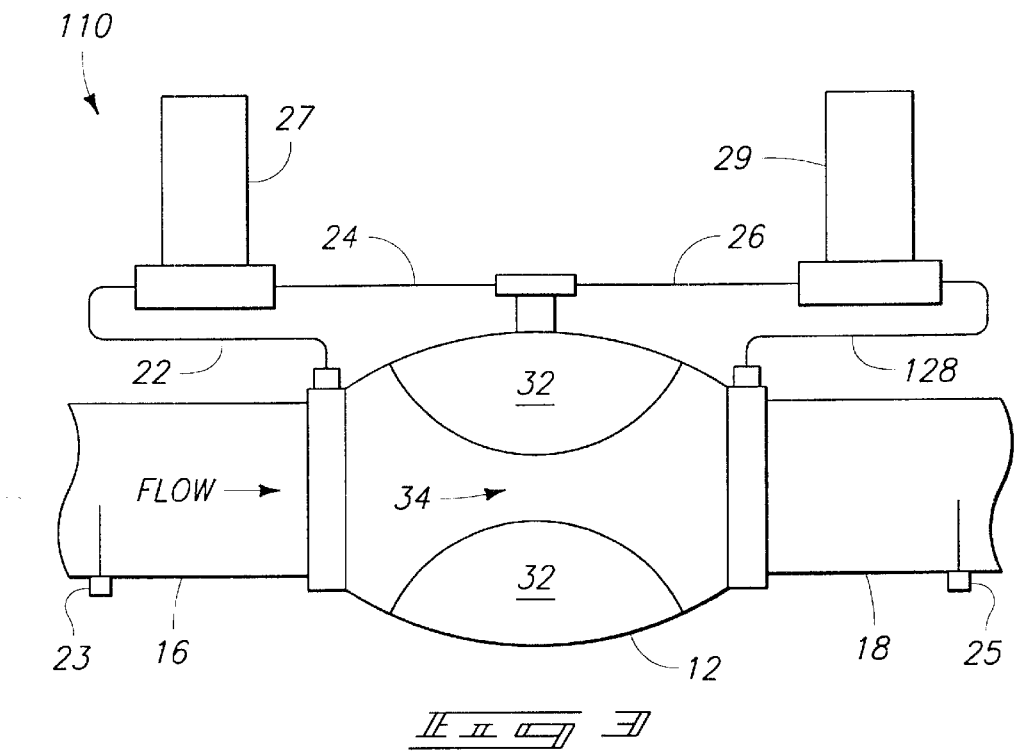
FIG. 3 is simplified schematic diagram illustrating a first alternative configuration for the system of FIG. 1 for regulating downstream pressure with two solenoid valves and a downstream discharge vent to a downstream line.
Figure 4:
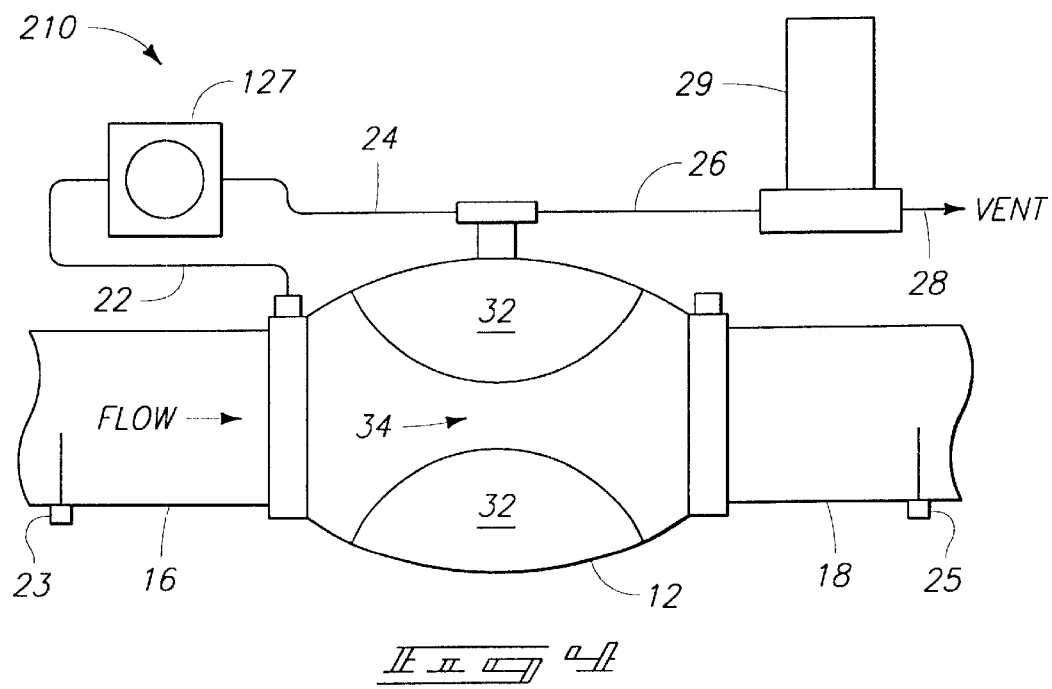
FIG. 4 is a simplified schematic diagram illustrating a second alternative configuration for the system of FIG. 1 for regulating downstream pressure with a single solenoid valve, a single orifice plate, and a discharge vent to atmosphere.

As shown in FIGS. 2–4, there exist a number of different possible component arrangements for the control mechanism of this invention. The components making up such control mechanism may include the following: a source of pressurized fluid such as lines 16 or 18; one or more solenoid valves such as valves 27 and 29; flow regulating orifices such as orifice 34; a discharge point such as vent 31 to atmosphere (or lower pressure); and a hydraulic connection to the control volume such as lines 22, 24 and 26, 28.

There exist two principal methods for electronically controlling the flow of fluid into and out of control volume 32, thereby regulating the position (or size) of the throttling element, or orifice, 34. In one instance, orifice 34 comprises an annular aperture. One method entails using a pair of two-way solenoid valves 27 and 29 that receive a pulse signal from a controller 38 of control system 36, wherein solenoids 27 and 29 are designed for actuation between fully open and fully closed positions. Such method is included in the preferred embodiment depicted with reference to FIGS. 1 and 2. An alternative method entails using a pair of solenoid or servoid valves that are capable of realizing proportional orifice control based upon receiving a proportional signal from a controller.

As shown in FIG. 1, controller 38 comprises memory 40 and processing circuitry 42. In one case, processing circuitry 42 is provided by a central processing unit (CPU). In another case, processing circuitry 42 is provided by a microcontroller. In one embodiment, processing circuitry provides control circuitry (not numbered). According to one implementation, controller 38 is configured to implement PID control so as to provide a PID electronic controller by implementing operating software similar to that depicted by the flowchart of FIG. 5.

Controller 38 comprises one or more input ports, or signal lines, 30; one or more output ports, or signal lines, 35, 37; a power supply 39; a serial communication interface 41; CPU 42; and memory 40. Input signal lines are provided for delivering pressure readings and other parameters to controller 38. Output signal lines are provided for delivering corrective signals and controlled output signals to solenoids 27 and 29.

With the embodiment of FIGS. 1 and 2, a mobile device, such as a laptop computer, is used to program PID control characteristics into controller 38 via a serial cable of serial communication interface 41. Input program settings are then retained in memory 40 until values for the settings are subsequently overwritten. Exemplary input parameters are as follows: target pressure(s) (or set point); sampling intervals; offset (to correct for reaction time of the control mechanism); scale up (scaling of corrective pulse if pressure is below a target value); scale down (scaling of corrective pulse if pressure is above a target value); and error width (the deadband or zone in which no corrective response is yielded).

In operation, the rate of response of electronic control valve 12 is dependent upon the above-referenced input parameters, along with the hydraulic properties of the irrigation system 11. The hydraulic properties include upstream pressure, friction losses, and other related or similar hydraulic properties such as viscosity of the fluid.

By using valve 12 and control system 36 of system 10, oscillatory fluid flow behavior within an irrigation system 11 can be effectively reduced or eliminated. By adding one or more pressure sensors, such as sensors 23 and 25, an advantage is provided in that pressure of fluid to be regulated can be routinely sampled. This sampling yields an absolute value that controller 38 compares to a programmed target value. Controller 38 then sends one or more appropriate corrective signals to control mechanisms, here solenoids 27 and/or 29. For the case where valve 12 comprises a zone control valve whose primary function is pressure regulation, an electronically controlled valve 12 can lock onto a target downstream pressure with a reasonable degree of accuracy, independent of upstream pressure fluctuations that might be present within line 16.

An additional advantage is provided by implementing electronic control via control system 36, wherein an ability is provided to discern oscillatory fluid flow behavior within system 10, and to further determine both the frequency and amplitude of such fluid oscillations. Such a scenario is of increased importance when valve 12 comprises a main control valve. A main control valve often provides a primary function of sustaining upstream pressure and regulating downstream pressure. An underlying motivation for implementing valve 12 as a main control valve is to bring pressure oscillations under control at such point in a system 11, thereby causing the entire system to more quickly settle down to a steady state fluid flow condition.

According to an alternative embodiment of the invention, control system 36 of FIG. 1 can be used to control the plurality of zone control valves, each similar to valve 12 of FIG. 1. Such plurality of zone control valves is provided within a manifold, or a bank of several valves. Each of such control valves is provided with dedicated mechanical components, such as solenoids and downstream pressure sensors. A single, common control system is then utilized to control all of the valves within the manifold, or bank, interrogating the respective sensors, and sending output signals accordingly.

According to one aspect, boot control valve 10 (of FIG. 1) provides a primary control valve that is provided in a primary fluid delivery line, and is operative to regulate fluid flow through the primary fluid delivery line. Solenoid 27 and/or solenoid 29 (see FIG. 1) provide an auxiliary control valve that is also provided in an auxiliary fluid delivery line extending between the primary control valve and the fluid delivery line. The auxiliary control valve is operative to regulate fluid flow through the auxiliary fluid delivery line. As shown in FIG. 1, the auxiliary fluid delivery line comprises one or more of lines 22, 24, 26 and 28 (see FIG. 1). The auxiliary fluid delivery line is operative to deliver fluid between the primary control valve and the fluid delivery line to controllably adjust the throttling element of the primary control valve. According to one construction, the throttling element comprises boot 33 (see FIG. 1). A processor, comprising processing circuitry, of a controller communicates with a pressure sensor that detects fluid pressure within the primary fluid delivery line. The processor further communicates with the auxiliary control valve. The processor is operative to controllably adjust the throttling element of the primary control valve by regulating operation of the auxiliary control valve to deliver fluid between the primary control valve and the fluid delivery line via the auxiliary fluid delivery line.

In order to quickly and efficiently bring oscillatory fluid flow behavior under control, there exist a number of techniques which can be employed by system 10. The first technique provides for a tuned, asymptotic approach toward the pressure set point without overshoot. More particularly, the electronic boot control valve seeks a final operating point based solely upon incremental corrections approaching the pressure set point without over-correction via the PID parameters. This technique is appropriate for transitions between zone valve operation during the course of an irrigation and system start-up. The prior art valves employing mechanical pilots are susceptible to control problems related to dead time and lag time, resulting in over-corrective changes in the position of the throttling element, leading to system instability. Accordingly, a tuned electronic boot control valve seeks the final operating point in an asymptotic manner, rather than following an underdamped or alternating pathway to the final operating point. If unsteady conditions or oscillatory behavior persists within the irrigation system following a transition, it is important for control valves to not reinforce this behavior by their reaction, which is a tendency of the mechanical pilot. Accordingly, a second technique is to controllably adjust a pressure sampling interval of a fluid to be regulated, to effectively cause a correction frequency or pattern that substantially negates detection of the fluid pressure oscillations. A third technique, similar to the second, allows the controller to discern an operating pressure base line about which fluid pressure oscillations occur to be used in calculating an error upon which the PID controller can provide corrective output signals. A fourth technique is to adjust a set point pressure of the fluid being regulated in order to seek an operating point that is more stable. Lastly, a fifth technique calls for control system 36 and valve 12 to actively create an oscillation that is substantially an inverse of the system oscillation in order to counteract the system oscillation, thereby bringing the system oscillation to a more stable operating point. Techniques two through five would be appropriate when technique one fails to produce system stability.

The above exemplary methods for actively controlling oscillatory fluid flow behavior are not intended to limit the scope of this invention. It is anticipated that intelligent implementations of control system 36 for system 10 can respond to system behavior that is not steady state. It is expected that various implementations of logic can be realized within control system 36 that can be combined with an existing PID loop, such as a PID implementation depicted according to the flowchart of FIG. 5.

Within the field of agricultural irrigation, system 10 can be operated in a number of different modified applications. For the case where electronically controlled valves 12 are provided within an irrigation system 11, including a system having drip lines, lateral lines of the system need to be routinely flushed for maintenance reasons due to the accumulation of silt and other solids within lines of the system. Typically, a higher pressure is required in order to flush the lines within a system, compared to the pressures encountered during normal operation of an irrigation system. System 10, responsive to programmed operation of controller 38, can be programmed to automatically raise operating pressure to a required operating point in order to flush lines within the system. Such raising of pressure in response to operation of controller 38 provides an automatic flushing feature within an irrigation system 11.

Another application for system 10 entails the use of controller 38 which is programmed to operate a linear control valve 12 to act as a "pressure relief" valve in order to avoid over-pressurizations of the lines within irrigation system 11. In the event of an over-pressurization situation, the downstream portion, or line 18, of valve 12 would be able to discharge fluid to a "safe" location, such as to a pond, a waste-way, or a canal.

More particularly, controller 38 can be preprogrammed with a specific pressure value which is compared with an output from pressure sensor 25. When a pressure from pressure sensor 25 exceeds the threshold value, controller 38 determines that an over-pressure condition exists. In response to detecting the over-pressure condition, a port, outlet, or valve within downstream line 18 is opened at a location which discharges the over-pressured fluid to a collection pond, waste-way, or canal.

Even another application entails utilizing control system 10 in a manner such that controller 38 is programmed in conjunction with linear control valve 12 in order to regulate a discharge pressure at an end-gun on a center-pivot irrigation device so as to enhance the ability to distribute water within the corners of a square or rectangular field in which the center-pivot irrigation system has been provided. By regulating discharge pressure from an end-gun on a center-pivot, the throw radius and discharge of the end-gun can be controllably adjusted in order to compensate for changes in field area that is irrigated by the end-gun. Controller 38 can be configured to generate signals that are choreographed with a determined location for the center-pivot within the field, such as by utilizing inputs from an electronic compass or a global positioning satellite (GPS) system as inputs to controller 38. An appropriate signal would be sent to the controller based on the detected position of the center-pivot, thereby providing input information that can determine a desired throw radius and discharge for the end-gun.

One variation for the end-gun application allows for the end-gun to be equipped with a variable orifice nozzle which can be controllably adjusted to realize a size that is appropriate for the discharge pressure realized within a fluid feed line of the center-pivot. It is understood that it is important to realize a proper water droplet size distribution with such an end-gun in order to provide appropriate distribution of fluid. In order to realize an adjustable nozzle orifice size, a skilled variation of control valve 12 could be used to regulate a nozzle size by utilizing the accompanying instrumentation associated with control system 36, but provided on an end of a center-pivot so as to provide an end-gun.

Such an electronic control valve device may be used in conjunction with "dual-system" irrigation systems, meaning those that employ more than one distribution system and/or discharge device. For example, an irrigation system that has more than one sprinkler distribution system comprises a dual-system irrigation system, such as in the case for frost control or cooling of orchards and vineyards. This implementation would be of value where differing discharge pressures are desired, depending on which system or discharge device is in operation. Such technique would also be of value for regulating flow at a pump. Such an electronic control valve device may be used in conjunction with an irrigation system employing discharge devices designed to operate at two or more distinctly different pressures. For example, a sprinkler system may be operated at a low pressure to discourage the formation of fine droplets that can be blown away by the wind. Conversely, when conditions are calm, the system may be operated at a higher pressure, encouraging the formation of fine droplets, which are less destructive to the surface of the soil. An external sensor, such as an anemometer (detecting wind speed) could be used to trigger a change in operating points.

Accordingly, an alternative embodiment of the invention allows for a single control system, such as control system 10 of FIG. 1, for operatively controlling multiple zone control valves in a manifold, or a bank of several valves. Each control valve includes a dedicated mechanical apparatus such as a solenoid and a downstream pressure sensor. According to one construction, there exists a single, common control system for operating all of the local valves, interrogating the respective sensors, and sending output signals to the solenoids for each respective valve, accordingly.

Furthermore, this alternative application can be integrated into a supervisory control and data acquisition (SCADA) system, including centralized irrigation control, for crop production. Both agronomic and environmental inputs are data-logged, thereby providing an information base from which an irrigation controller could make intelligent decisions. Such a system could be provided in closed-loop form, or an open-loop form, thereby allowing outside intervention, including remote access.

FIG. 3 illustrates a first alternative configuration for system 10 of FIG. 1 comprising the electronic fluid valve and control system 110 for regulating downstream pressure using a pair of solenoid valves 27 and 29, and a discharge vent that discharges fluid from boot control volume 32 of valve 12 into a downstream line 18. Valve 12 is substantially the same as valve 12 in FIGS. 1 and 2. Two-way solenoid valve 27 includes boot control volume lines 22 and 24. Two-way solenoid valve 29 includes discharge line 26 as well as a downstream discharge line 128 which discharges downstream of valve 12 into downstream line 18. System 110 implements downstream pressure regulation via the hydraulic connection and control mechanism implemented therein. A controller of system 110 (not shown) controllably operates valve 12 via solenoid valves 27 and 29 in order to regulate downstream pressure. It is further understood that system 110 includes an upstream and downstream pressure sensor, as shown in FIGS. 1 and 2, even though they are not illustrated herein. For the case of an alternative design where upstream pressure within upstream line 16 and downstream pressure within downstream line 18 provides a sufficient pressure differential, venting into downstream line 18 will not be restricted.

FIG. 4 is a second alternative configuration for system 10 of FIGS. 1 and 2 comprising electronic fluid valve and control system 210. System 210 regulates downstream pressure using a single solenoid valve 29 and a single orifice plate 127. System 210 includes a discharge vent 28 which vents fluid to atmosphere when solenoid valve 29 is opened, thereby discharging fluid from boot control volume 32 via discharge line 26. Orifice plate 127 is controllably operated via a controller of system 210 to open and close, thereby controllably supplying fluid to boot control volume 32 via boot control volume lines 22 and 24. Line 24 is provided at an upstream end of valve 20, immediately adjacent upstream line 16.

More particularly, orifice plate 127 comprises an adjustable flow restriction device having an orifice and a flow-restricting plate interposed between lines 22 and 24 which regulates fluid flow from upstream line 16 into boot control volume 32. In one case, the flow-restricting plate is supported for rotation relative to a support housing. According to one construction, an in-line, internal filter is provided within line 22 to prevent the entrance of dirt into orifice plate 127 which might otherwise clog orifice plate 127. System 210 is controllably implemented to realize downstream pressure regulation via the hydraulic connections and control mechanism illustrated therein, and further illustrated with reference to the control system of FIGS. 1 and 2.

In operation, system 210 provides a relatively low-cost implementation for realizing downstream pressure regulation.

Figure 5:
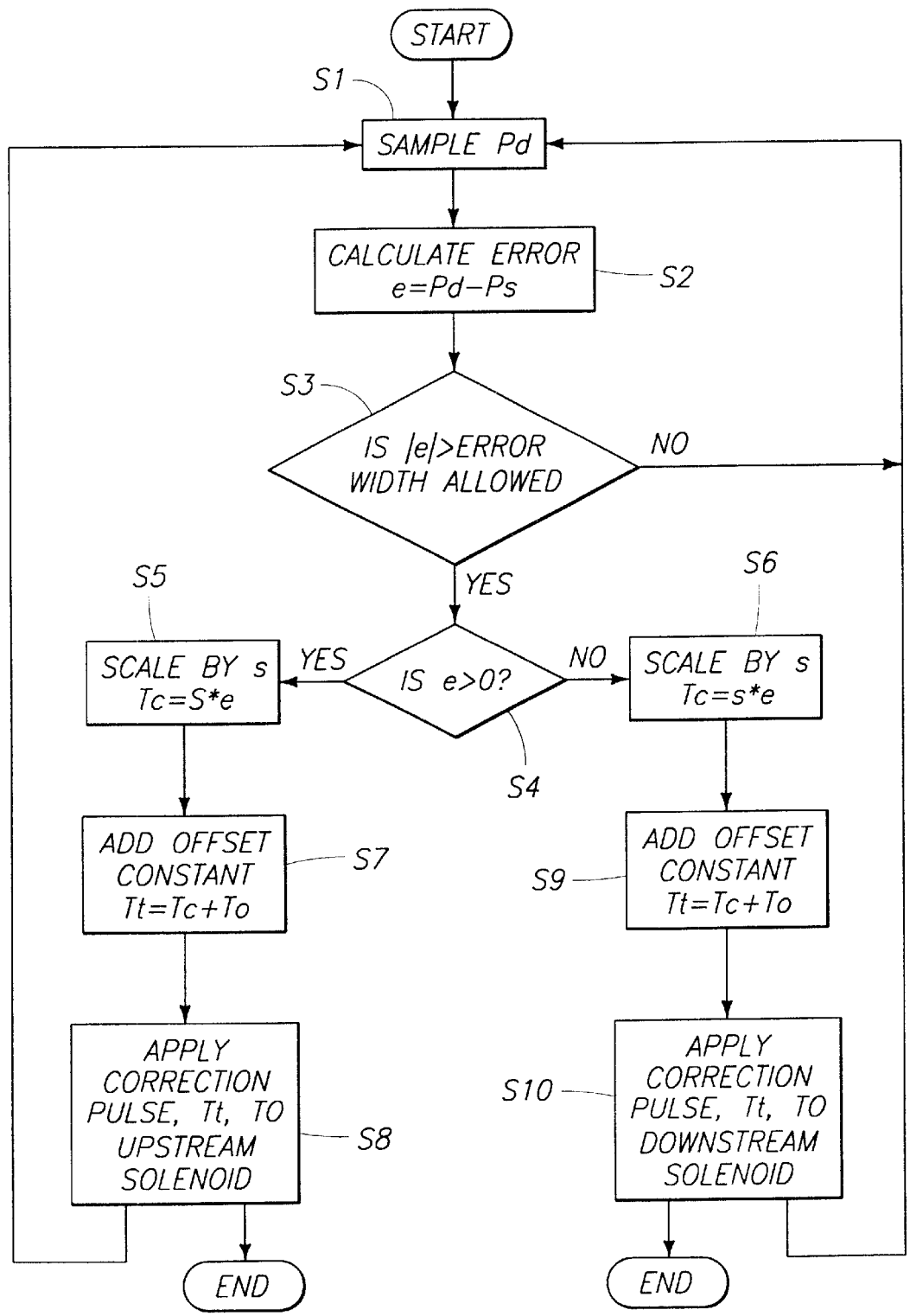
FIG. 5 is a flowchart illustrating one implementation for PID loop control logic for realizing pressure control with the embodiment of FIGS. 1 and 2.

FIG. 5 forms a process flow diagram, or flowchart, showing the logic processing for implementing the proportional component of proportional integral derivative (PID) control within the controller of FIGS. 1 and 2, comprising a PID-loop control logic for realizing pressure control using a boot control valve.

In Step "S1", the controller samples downstream pressure, $P_d$, using pressure 25 (of FIG. 1). After performing Step "S1", the process proceeds to Step "S2".

In Step "S2", the controller calculates a fluid pressure error, $E = P_d - P_s$, wherein $P_s$ is a set point pressure provided for controlling the boot control valve. After performing Step "S2", the process proceeds to Step "S3".

In Step "S3", the controller determines whether the fluid pressure error is within a threshold level in order to determine whether sensitivity falls within a deadband range of pressure. More particularly, if the absolute value of the calculated fluid pressure error of Step "S1" is greater than a predetermined error width which is allowable ($|e|>$"error"), the process proceeds to Step "S4". If the absolute value of the error is not greater than the allowed error width, the process returns to Step "S1" and sampling is carried out in a timed manner over a controlled sample interval, i.

In Step "S4", the controller determines whether the error is greater than zero. If the controller determines that the error is greater than zero, the process proceeds to Step "S5". If the controller determines that the error is not greater than zero, the process proceeds to Step "S6".

In Step "S5", the controller calculates the duration of a correction pulse, $T_c$, by scaling the error by multiplying the error value, e, by the value "S". Accordingly, $T_c=S^*e$. After performing Step "S5", the process proceeds to Step "S7".

In Step "S7", the controller adds an offset constant, $T_o$, to the duration of correction pulse, $T_c$. Accordingly, $T_f=T_c+T_o$. It is understood that $T_o$, the offset constant, accounts for transition time within the value of the duration of correction pulse, $T_c$. After performing Step "S7", the process proceeds to Step "S8".

In Step "S8", the controller applies a correction pulse, $T_f$, as calculated in Step "S7", above, to the upstream solenoid, thereby opening the solenoid for a period, $T_f$. After performing Step "S8", the process proceeds back to Step "S1" and continues. Alternatively, when the control system is shut off, the process is terminated.

In Step "S6", the duration of correction of a correction pulse, $T_c$, is calculated by multiplying the error, e, by a scaling factor, s. Accordingly, $T_c=s^*e$. After performing Step "S6", the process proceeds to Step "S9".

In Step "S9", the controller adds an offset constant, $T_o$, to the duration of the correction pulse, $T_c$. Accordingly, $T_f=T_c+T_o$. After performing Step "S9", the process proceeds to Step "S10".

In Step "S10", the controller applies a correction pulse, $T_f$, as calculated in Step "S9", above, to the downstream solenoid, thereby opening the solenoid for a period, $T_f$. After performing Step "S10", the process proceeds back to Step "S1" and continues. Alternatively, when the control system is shut off, the process is terminated.

Figure 6:
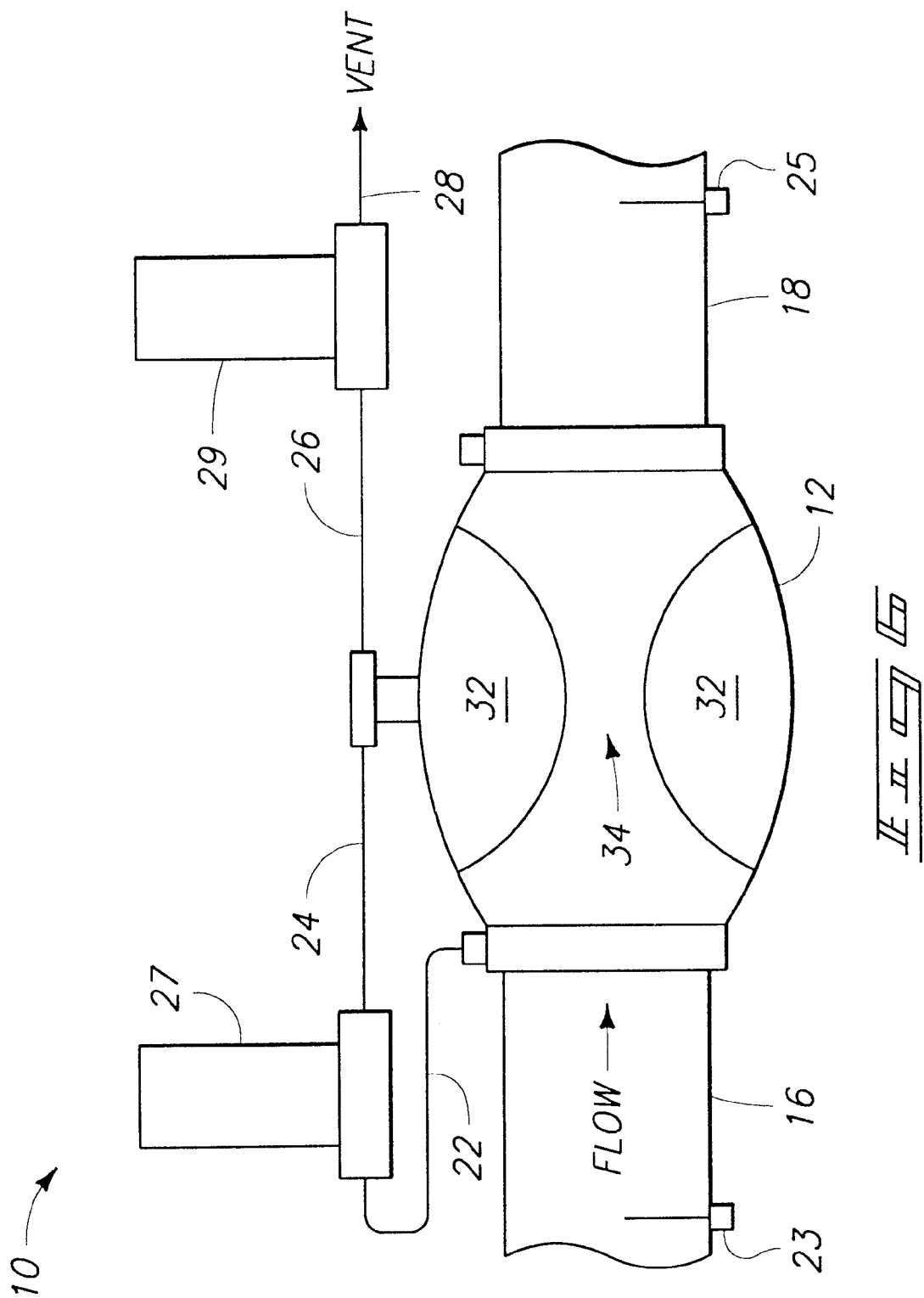
FIG. 6 is a simplified schematic diagram illustrating an embodiment of the electronic valve and apparatus similar to the system of FIGS. 1 and 2 and having an electronic pilot and used to generate the plots of FIGS. 7 and 8.

FIG. 6 comprises a configuration for electronic fluid valve and control system 10 (further described within a similar, related embodiment with reference to FIGS. 1 and 2) as utilized in an experimental test configuration at an irrigation hydraulic laboratory. Tests were conducted using water as a hydraulic fluid which was delivered from upstream line 16 to downstream line 18. Model Nos. ASCX30DN (30 psi) and ASCX60DN (60 psi) gauge pressure sensors, manufactured by Sensym ICT, of Milpitas, Calif., were also used. Furthermore, Baccarra E43 three-way solenoids, distributed by Nelson Irrigation Corporation of Walla Walla, Wash., were used. The data-logging system used in the test was an Opto-22 M4RTU with programmable inputs and outputs and 24-bit A/D. A boot control valve manufactured by Nelson Irrigation Corporation, of Walla Walla, Wash., was also used. Comparative test results for this configuration and a mechanical pilot configuration are provided below with reference to FIGS. 7–11.

FIG. 7 is a plot of experimental data depicting downstream pressure response to an upstream pressure spike using the experimental test configurations for the system 10 of FIG. 6. More particularly, downstream pressure response is plotted in response to an upstream pressure spike, utilizing an electronic pilot on an electronic valve according to system 10.

As shown in FIG. 7, upstream pressure, $P_{UP}$, is measured by pressure sensor 23 (see FIGS. 1 and 2). A corresponding plot of downstream pressure, $P_{DOWN}$, as measured by sensor 25 (see FIGS. 1 and 2), is also plotted. A corresponding boot pressure, $P_{BOOT}$, is further illustrated. A resulting fluid flow, F, is further plotted.

Fluid flow, F, is measured utilizing a fluid flow sensor such as a Model No. HO4x4-75-1M-F13S, Hofer 4-inch Turbine flowmeter, sold by Hofer Flow Controls, Inc., of Elizabeth City, N.C. Alternatively, an ultrasonic flow sensor, an electromagnetic flow sensor, or a mechanical flow sensor could have been used.

As illustrated by the plot in FIG. 7, use of an electronic pilot with an electronically controlled valve of system 10 results in a downstream pressure that is relatively uniform. In response to a relatively large upstream pressure spike, a very small fluctuation occurs to downstream pressure which very quickly returns to the same pressure, independent of upstream "sample", as seen in the data plotted in FIG. 7.

For purposes of evaluating such response, a gate valve upstream of system 10 (see FIG. 12) was shut off, restricting the flow of fluid into the system. Accordingly, test data after time 14:34 shows a sudden decrease in upstream pressure and boot pressure, and data past such time is inaccurate because the gate valve and supply of fluid was turned off past this point. Furthermore, it is understood that the visible spike in downstream pressure, $P_{DOWN}$, which coincides with the sudden spike in upstream pressure, $P_{UP}$, can be eliminated or minimized by adjusting a selection of hardware within the system, such as by providing a larger orifice within the solenoid.

Figure 8B:
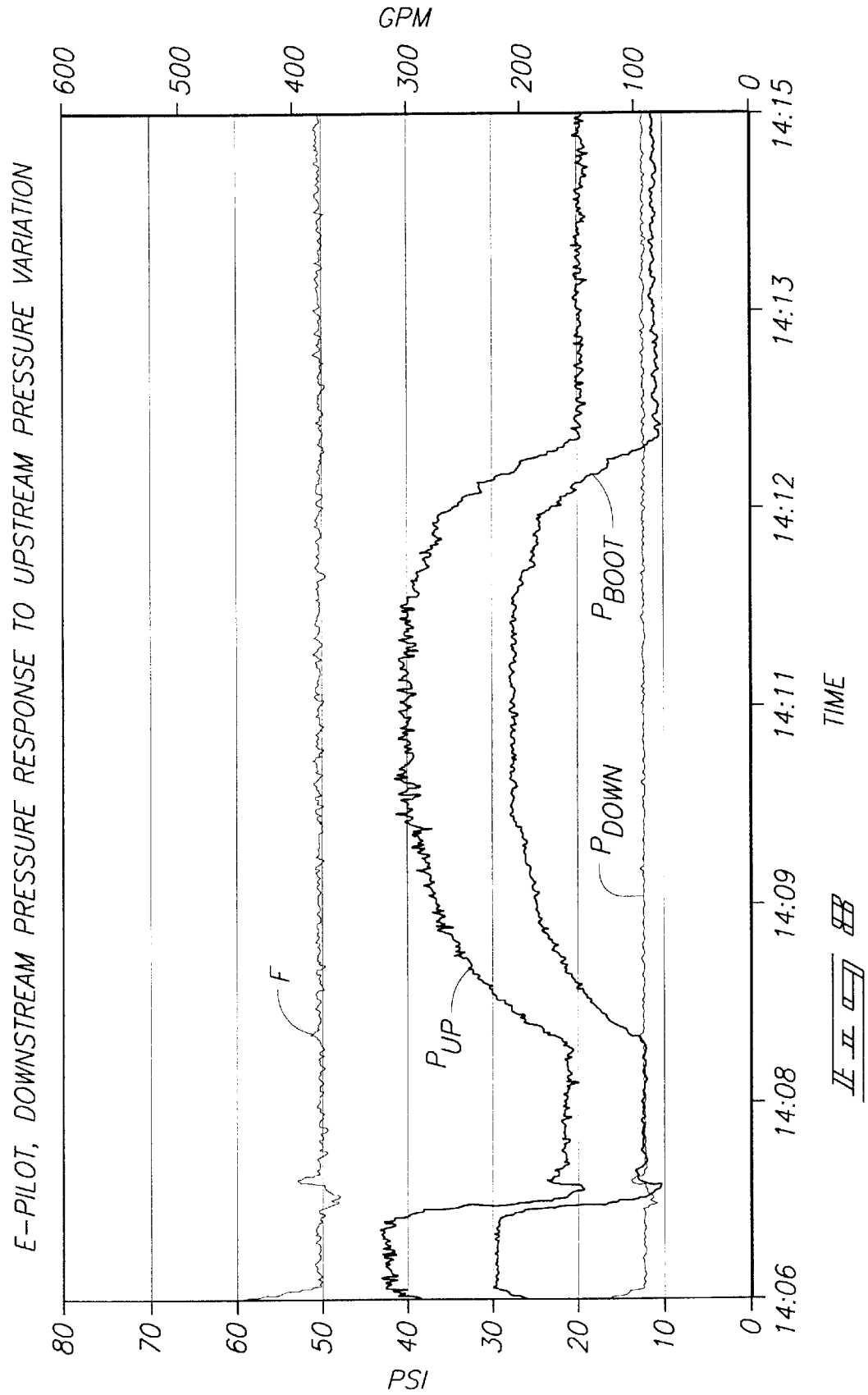
FIG. 8 is a plot of experimental data depicting downstream pressure response to upstream pressure variation using the experimental test configuration of FIG. 6.

FIG. 8 illustrates the downstream pressure response to an upstream pressure variation for an electronic valve having the electronic pilot according to the system of this invention, as identified in FIGS. 1, 2 and 6. According to the experimental results, upstream pressure, $P_{UP}$, downstream pressure response $P_{DOWN}$ is substantially uniform throughout the entire test, even though upstream pressure $P_{UP}$ and boot pressure $P_{BOOT}$ were caused to vary significantly. Furthermore, flow, F, remains substantially constant across such test. Accordingly, the electronic pilot of the electronic control valve was found to exhibit a substantially uniform downstream pressure in response to an upstream pressure variation independent of direction of approach.

Figure 9:
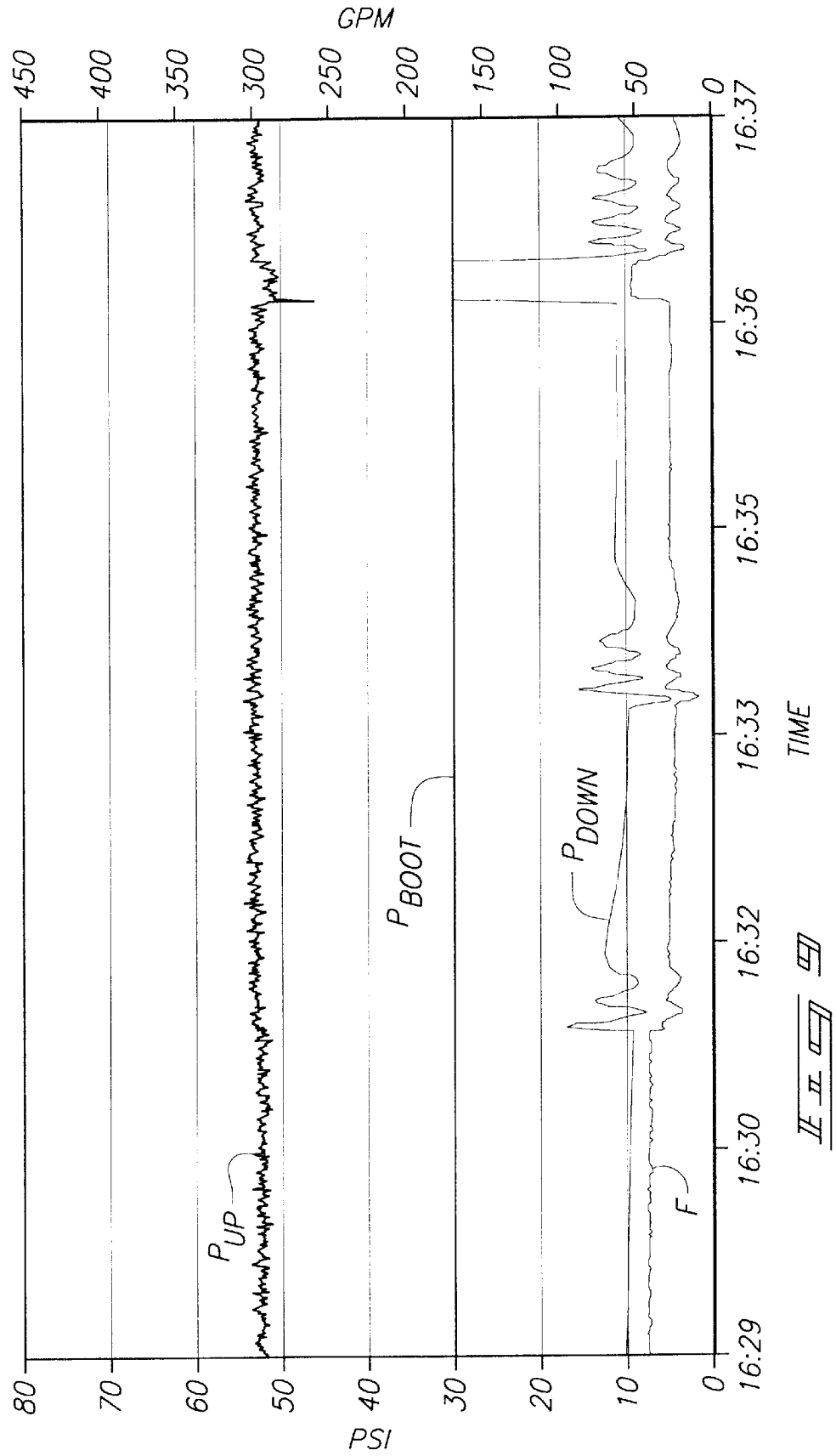
FIG. 9 is a plot of experimental data depicting downstream pressure characteristic response to temporary valve closure at low flow for a traditional mechanical pilot and valve.

FIG. 9 illustrates by example a downstream pressure characteristic response to a pressure oscillation that occurs within an irrigation system. In order to create a pressure oscillation in a laboratory setup, a valve is temporarily closed while the system was operating at a low flow rate with a mechanical pilot using a Nelson 800 Series boot control valve. Accordingly, temporary closure of the valve simulated or induced a pressure oscillation within the irrigation system. As shown in FIG. 9, upstream pressure $P_{UP}$ remains relatively uniform. Boot pressure $P_{BOOT}$ is also shown at a constant value. However, the pressure sensor was maxed out during such test, thereby exceeding the 30 psi value shown in FIG. 9. However, variations occurred in downstream pressure corresponding with each temporary valve closure. Such variations comprise exhibited downstream pressure oscillations which are underdamped and which correspond with variations in flow, F. Such variations occurred concurrently with a temporary closure of the boot control valve at a relatively low flow rate. Three such closures are visually apparent upon reviewing the downstream pressure and flow plotted in FIG. 9. Hence, the sensitivity of a boot control valve that is controlled with a mechanical pilot according to prior art techniques is readily apparent, wherein downstream pressure variations result from temporary closure of an upstream fluid supply valve at low flow rates.

Figure 10:
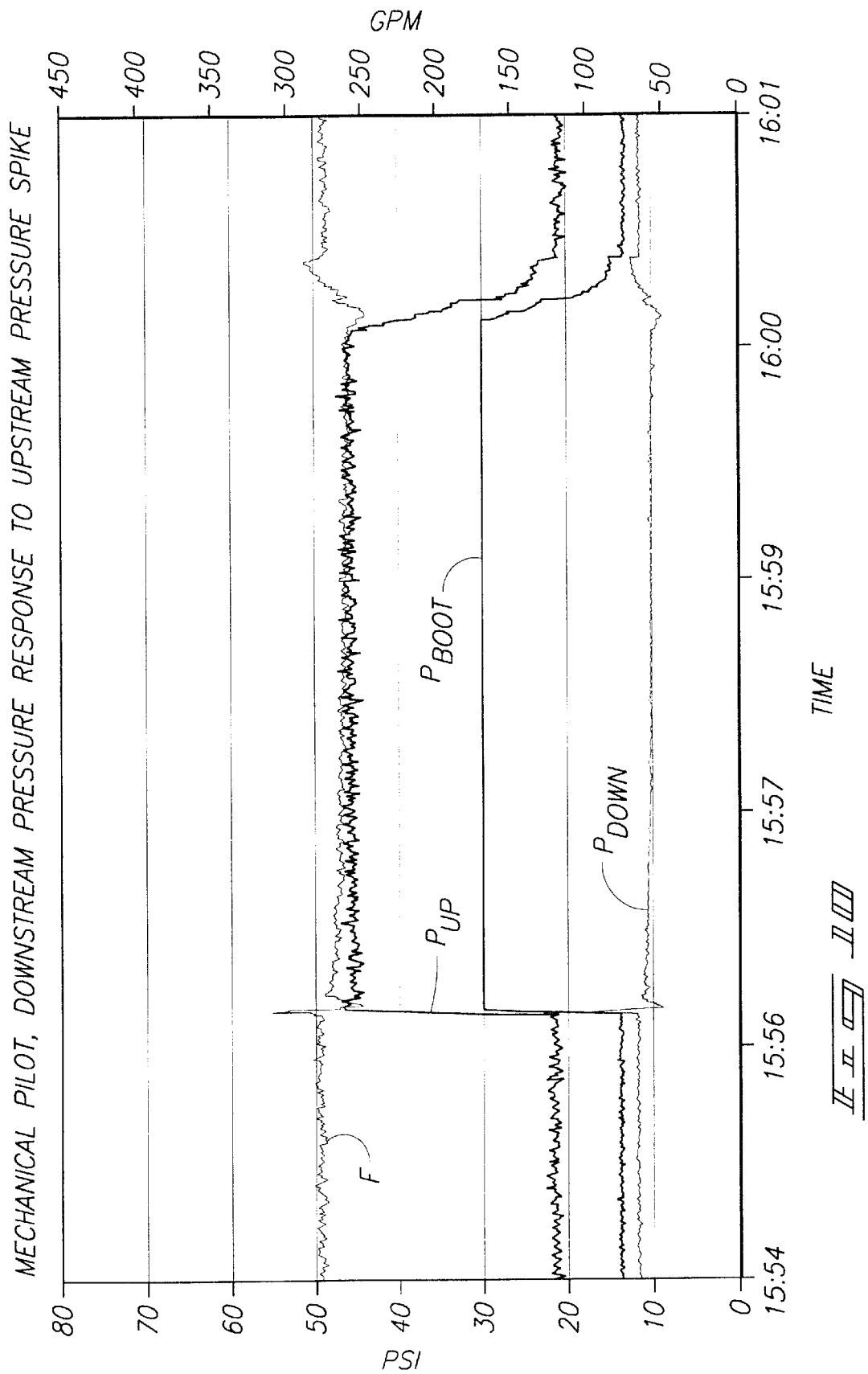
FIG. 10 is a plot of experimental data depicting downstream pressure response to an upstream pressure spike for a traditional mechanical pilot and valve.

FIG. 10 illustrates a downstream pressure response to an upstream pressure spike for a boot control valve using a mechanical pilot according to prior art techniques. A sudden increase in upstream pressure, $P_{UP}$, causes a substantial corresponding increase in boot pressure, $P_{BOOT}$. As shown in FIG. 10, $P_{BOOT}$ reaches a sensor limit of 30 psi, thereby "maxing out" the output. In response to such an increase in upstream pressure, downstream pressure $P_{DOWN}$ overshoots in an underdamp manner immediately thereafter. A similar event occurred when upstream pressure was suddenly decreased, after which downstream pressure oscillates and overshoots a steady state value. Such overshooting comprises a ringing of the downstream pressure signal which is an indication of an underdamped response. Furthermore, following a sudden increase in upstream pressure $P_{UP}$, downstream pressure $P_{DOWN}$ drifts overtime.

As shown in FIG. 10, the experimental test system was a relatively rigid system having rigid fluid flow lines. Accordingly, any tendency for fluid pressures to oscillate downstream was substantially mitigated. It is anticipated that the addition of elastic components to the system would amplify the tendency to oscillate. However, overshoot was still observed in response to sudden pressure spikes and decreases.

Figure 11:
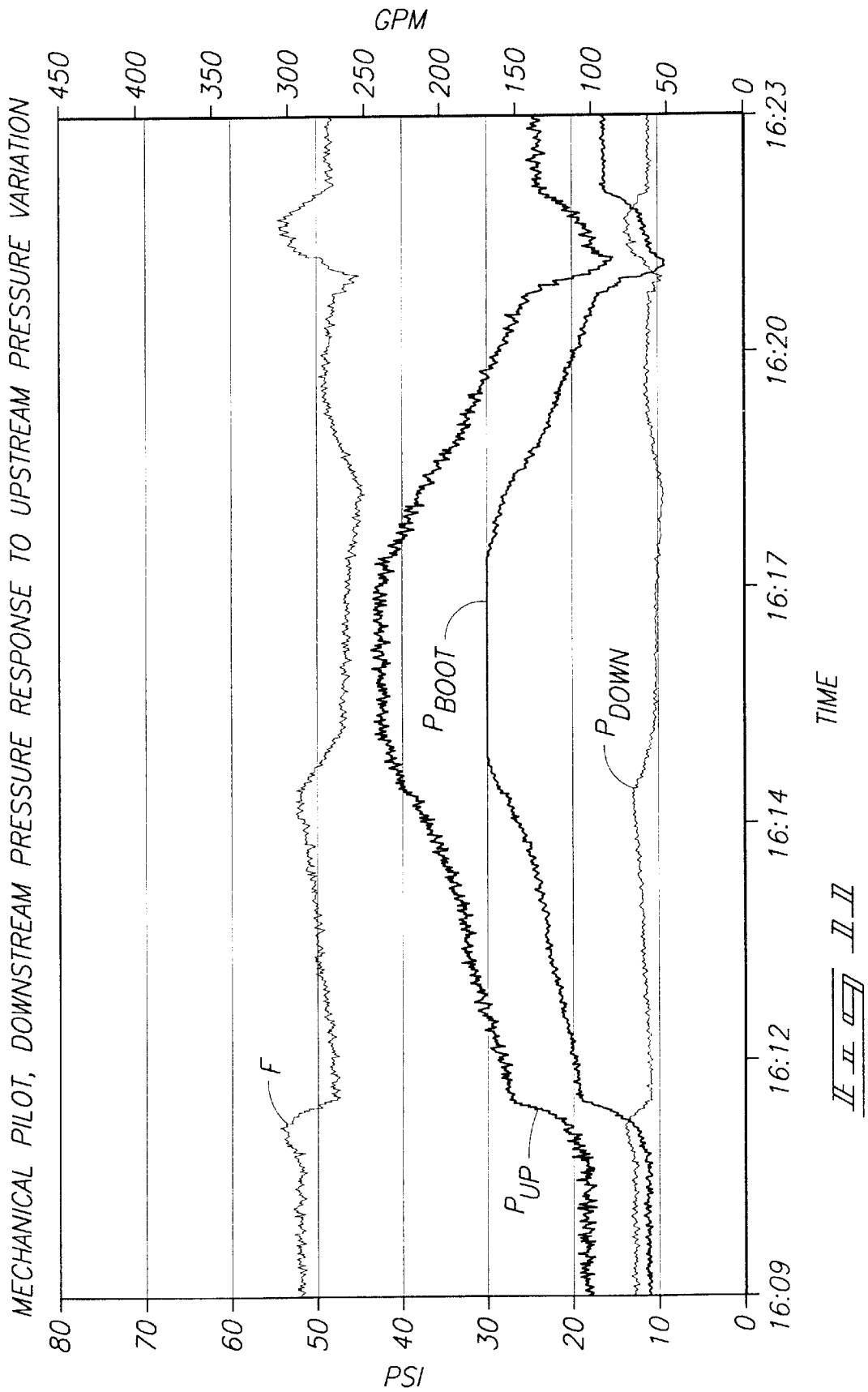
FIG. 11 is a plot of experimental data depicting downstream pressure response to upstream pressure variation for a traditional mechanical pilot and valve.
Figure 11:
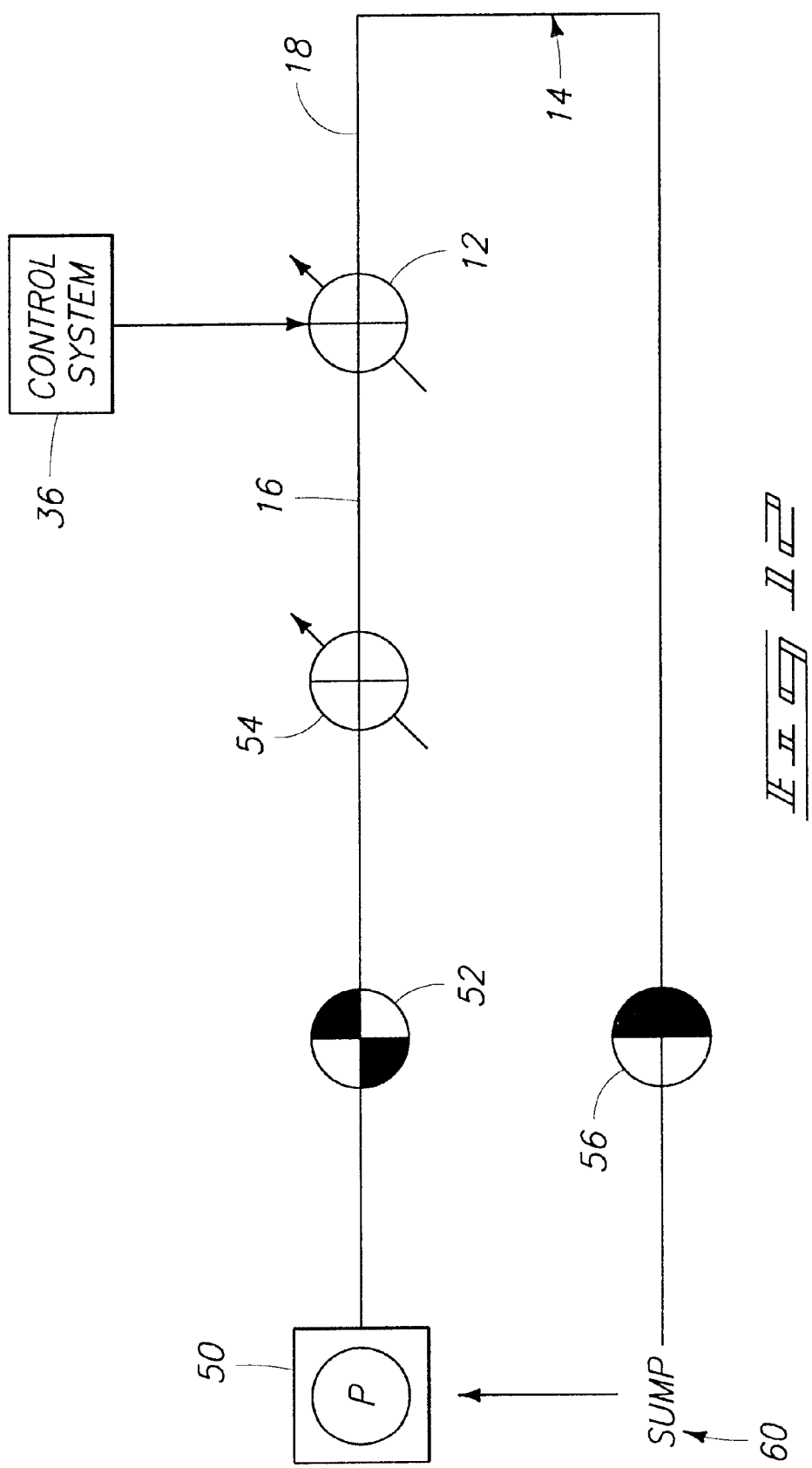
Figure 11E:
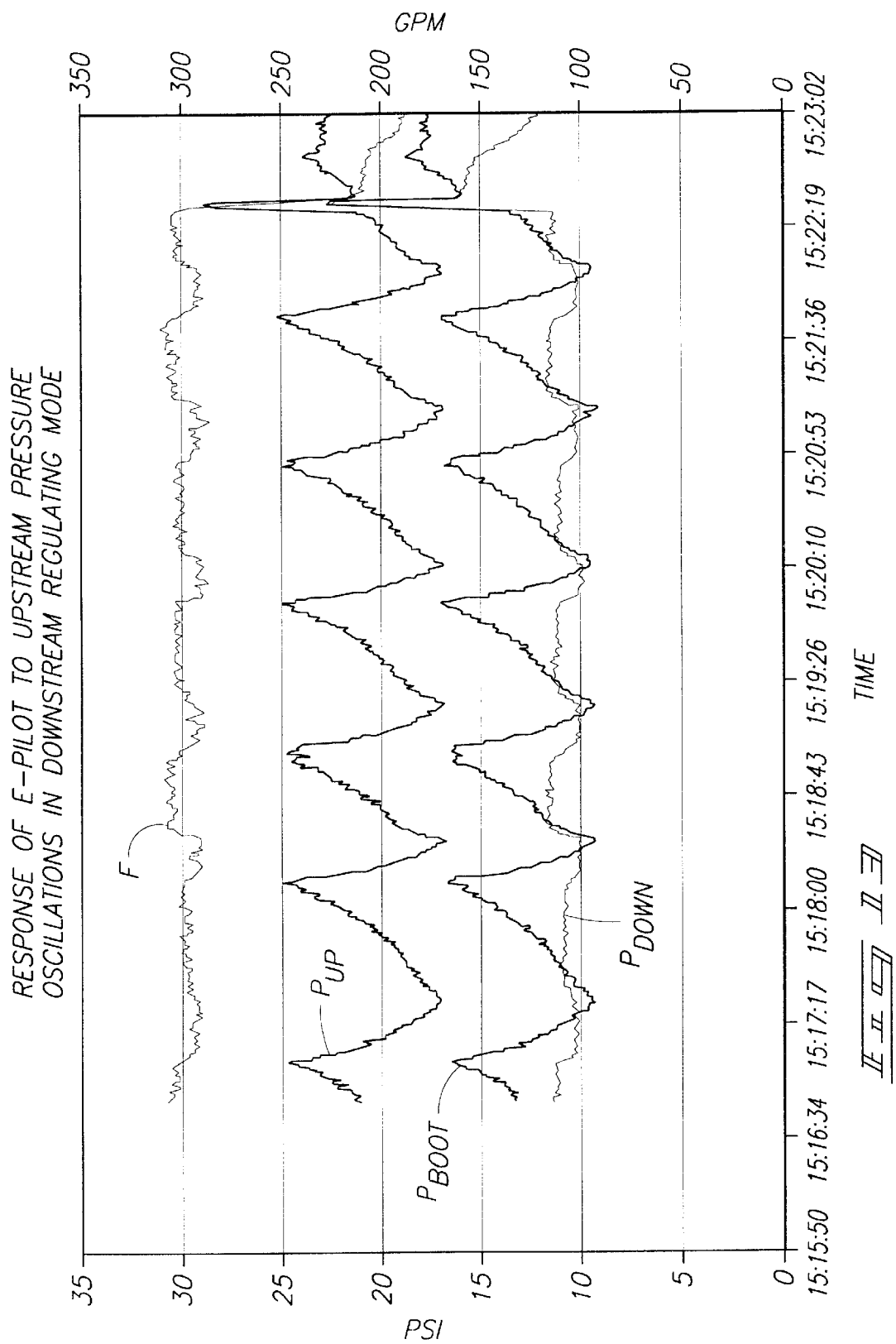
Figure 11:
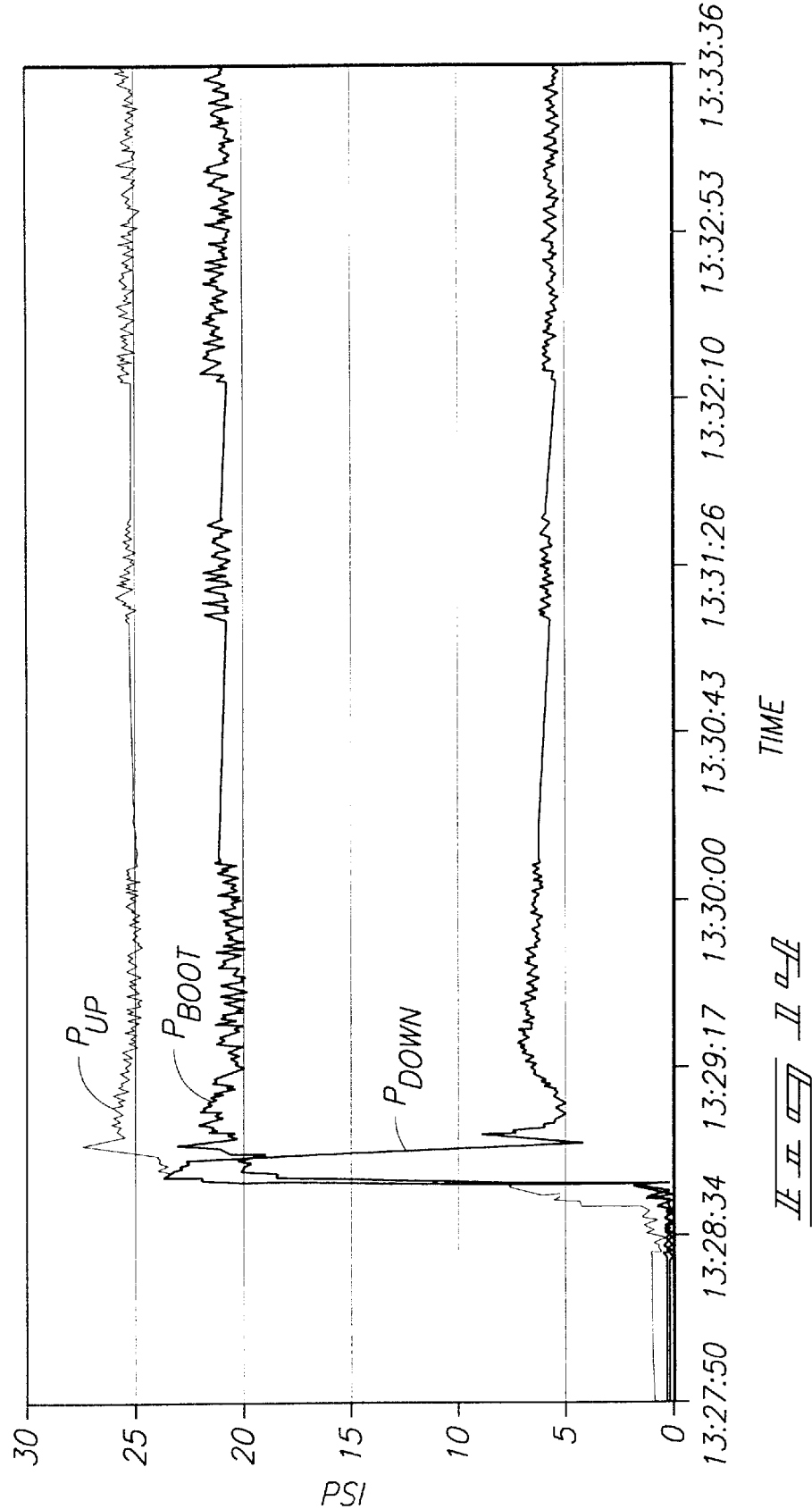

FIG. 11 illustrates downstream pressure response to an upstream pressure variation using a boot control valve having a mechanical pilot according to prior art techniques. The response illustrated in FIG. 11, when compared with the response of the boot control valve control with an electronic pilot as shown in FIG. 8, significantly depicts the benefits of the system of Applicant's invention (according to FIGS. 1, 2 and 6) when compared to a boot control valve control of the mechanical pilot as illustrated in FIG. 11. More particularly, variations in upstream pressure $P_{UP}$ result in significant variations in flow, F; boot pressure, $P_{BOOT}$; and downstream pressure, $P_{DOWN}$. More particularly, significant fluctuations occur in downstream pressure, $P_{DOWN}$, in response to upstream pressure variations, $P_{UP}$. Hence, a boot control valve utilizing a mechanical pilot, according to prior art techniques, provides a significant disadvantage over utilization of an electronic pilot on a boot control valve according to the control system of this invention, as evidenced by the plot of $P_{DOWN}$ in FIG. 8 which is relatively free of significant fluctuations.

FIG. 12 comprises a configuration including the electronic boot control valve and control system 10 (of FIGS. 1, 2, and 6), and as utilized in another experimental test configuration at an irrigation hydraulic laboratory. Tests were conducted using water as a hydraulic fluid which was delivered from an upstream pump 50 along line 14 and through a manual butterfly valve 52. A six-inch linear control valve was provided for downstream pressure regulation, having a mechanical pilot. Valve 12 and control system 36 were provided downstream of mechanical pilot valve 54. Another manual butterfly valve 56 was provided downstream of valve 12, and a sump 60 was provided further downstream for collecting water delivered through line 14. Test results for this configuration as well as for a similar configuration are provided below with reference to FIGS. 13–17. As shown in FIG. 12, a testing facility within a hydraulic laboratory was utilized to generate the experimental data of FIGS. 13–17. The test facility included a closed-loop pumping system comprising pump 50 which draws water from an open sump 60, pumping the water through a pipeline, or line, 14 where the water is eventually discharged back into sump 60. Manually operated butterfly valves 52 and 56 are used to throttle and regulate flow at both the pump discharge and at the pipeline discharge locations. A flange-to-flange coupler is provided within line 14 to allow for relatively easy installation of control valves into the pipeline circuit, such as installation of valve 12.

The test facility of FIG. 12 also comprises three pressure transducers which were located at various points of interest within line 14. According to one construction, the pressure transducers each comprise a 30 psi full-scale, 24-bit analog-to-digital conversion pressure transducer that measures fluid pressure within line 14. Additionally, the instrumentation comprises an electronic flow-meter interposed in line 14. Parameters from each of these instruments were then data logged.

FIG. 13 is a plot of experimental data depicting the electronic pilot for the electronic fluid valve 10 (of FIGS. 1, 2, and 6) functioning in a downstream pressure regulating capacity.

As shown in FIG. 13, data is plotted for an electronic pilot on an electronic boot control valve which shows the response of the valve and pilot to upstream pressure oscillations. The electronic pilot varies positioning of the boot by alternately venting and filling the control volume with fluid, as indicated by boot pressure, $P_{BOOT}$, in FIG. 13, in response to downstream pressure readings, $P_{DOWN}$. As shown in FIG. 13, boot pressure, $P_{BOOT}$, and upstream pressure, $P_{UP}$, resulted from placement of a six-inch linear control valve with a mechanical pilot into the lines of the test facility, indicated by valve 54 of FIG. 12. The mechanical pilot valve 54 provides downstream pressure regulation upstream of the test valve 12. Such six-inch valve was unable to adequately stabilize the downstream pressure for two reasons. First, an oversized pump 50 (see FIG. 12) supplied the hydraulic circuit of FIG. 12. Secondly, there existed a slightly lower flow within the hydraulic circuit than was ideal for the six-inch valve.

However, the results of FIG. 13 show that an electronic pilot on an electronically controlled boot control valve is readily capable of smoothing out pressure oscillations downstream of the control valve, as indicated by the plot of downstream pressure, $P_{DOWN}$, wherein the pressure oscillations are significantly dampened or flattened out over those seen in the plots of upstream pressure, $P_{UP}$, and boot pressure, $P_{BOOT}$.

Additional testing was also performed with reference to FIGS. 14–17. According to FIG. 14, data from hydraulic laboratory testing illustrates the performance of a classic mechanical pilot on a boot control valve comprising a Nelson 800 Series control valve, of Nelson Irrigation Corporation, of Walla Walla, Wash. Performance for the prior art mechanical pilot and boot control valve is shown from a start-up condition of zero fluid flow. A relatively low reference load of 5 psi was set for the mechanical pilot for downstream pressure regulation.

Downstream pressure, $P_{DOWN}$, illustrates a dampened wave-like pattern upon start-up. Initially, a significant spike is shown in downstream pressure, $P_{DOWN}$, in the magnitude of pressure variation, and the magnitude of pressure variation thereafter diminishes. However, it is apparent from the plot in FIG. 14 that it takes approximately four minutes for the downstream pressure, $P_{DOWN}$, to "settle down" to the desired set point pressure. Smooth, straight line segments of $P_{UP}$, $P_{BOOT}$, and $P_{DOWN}$ correspond with plot segments that are missing data and are to be disregarded accordingly.

FIG. 15 shows hydraulic test laboratory data for an electronic pilot and an electronic boot control valve illustrating performance from a start-up condition of zero flow to an increase in flow. As shown in FIG. 15, there exists an initial spike in downstream pressure, $P_{DOWN}$, which is of substantially smaller magnitude than for that of a mechanical pilot on the same boot control valve (see FIG. 14 for comparison). Furthermore, the downstream pressure, $P_{DOWN}$, settles down quickly to the desired set point at 5 psi, compared with that illustrated in the mechanical pilot of FIG. 14. During testing, fluid flow was measured at 225 gallons per minute at the elevated level of flow illustrated in FIG. 15. A power outage of approximately 14:53:00 caused a visible, sudden decrease in $P_{UP}$, $P_{BOOT}$, and $P_{DOWN}$, and data after this time should be ignored. FIGS. 14 and 15 illustrate the ability of the Nelson control valve itself to regulate flow at low pressure. However, FIG. 15 illustrates the comparative advantage, in both accuracy and precision, that can be achieved by electronic control versus the mechanical pilot.

Figure 16:
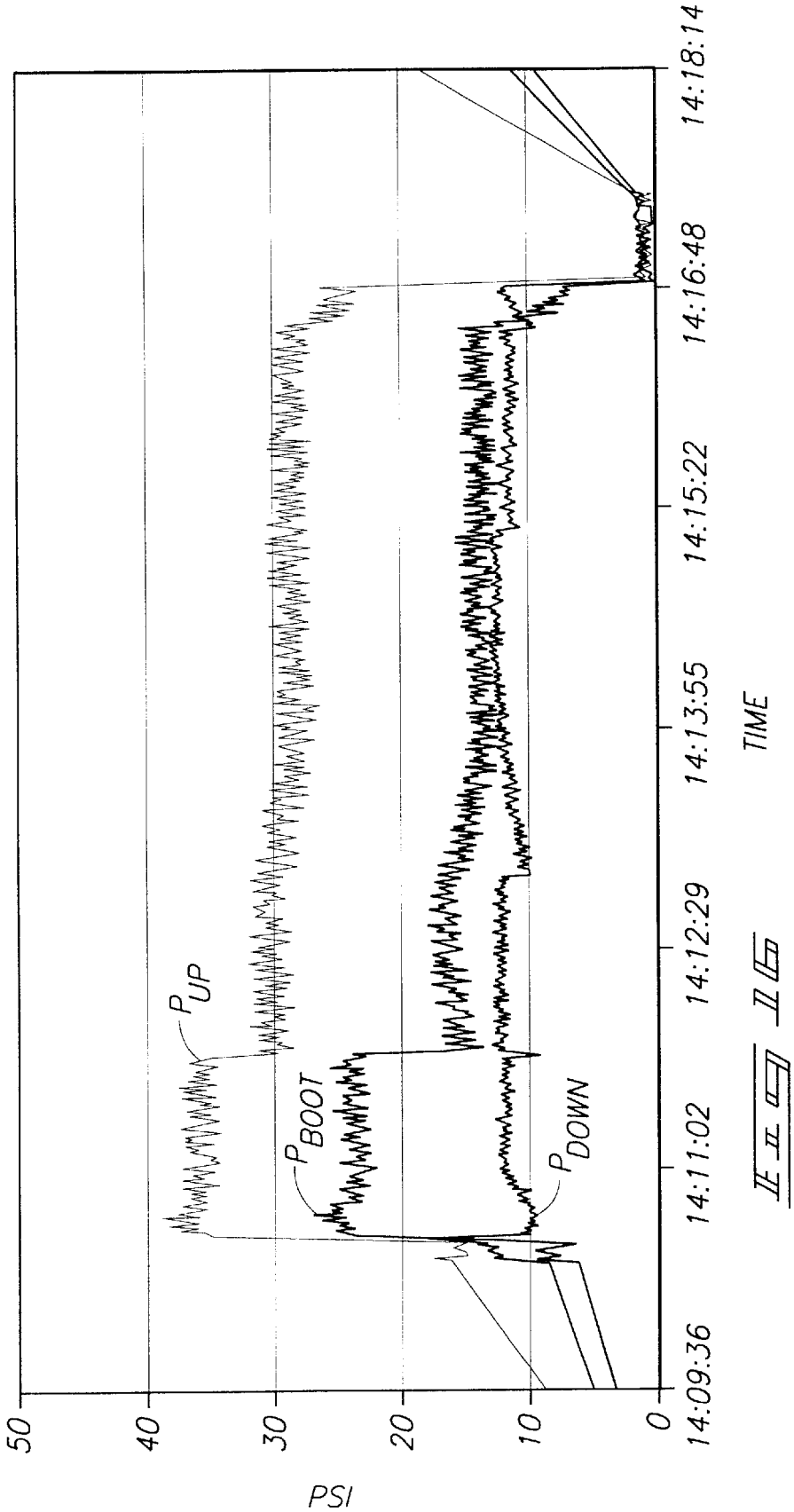
FIG. 16 is a plot of experimental data depicting upstream pressure, downstream pressure, and boot pressure for a boot control valve controlled with a mechanical pilot and substituted for the electronic valve in the test configuration of FIG. 14, and illustrating pressure response at start-up at a different set point than that shown in FIG. 14.

FIG. 16 illustrates how hydraulic laboratory data illustrating performance for a mechanical pilot on a boot control valve at start-up, but at a different set point pressure of 10 psi (over that illustrated for FIG. 14). As shown in FIG. 16, the mechanical pilot experienced difficulty in achieving the higher set point pressure, particularly as upstream pressure varied. The measured fluid flow rate was 508 gallons per minute at the elevated level. A power outage of approximately 14:16:48 caused a visible, sudden decrease in $P_{UP}$, $P_{BOOT}$, and $P_{DOWN}$, and data after this time should be ignored.

FIG. 17 illustrates hydraulic laboratory data for the electronic pilot on the electronic boot control valve showing performance at a set point of 10 psi. The data shows how the downstream pressure holds steady as upstream pressure is gradually decreased. For this test case, fluid flow was measured at a constant 176 gallons per minute. FIG. 17 further shows the response of downstream pressure, $P_{DOWN}$, to a spike in upstream pressure, $P_{UP}$. Such response is very similar to the response shown for the electronic pilot and electronic boot control valve in FIG. 15. A power outage of approximately 15:08:38 caused a visible, sudden decrease in $P_{UP}$, $P_{BOOT}$, and $P_{DOWN}$, and data after this time should be ignored.

As shown above with reference to FIGS. 14–17, a series of tests were run at a hydraulic laboratory to observe differences between the performance of an electronic and a mechanical pilot when placed upon a boot control valve.

Furthermore, it is understood that there exist diagnostic capabilities associated with use of an electronic pilot when using the control system of the present invention. More particularly, there exists an ability to discern system failures, such as line breaks or blockages that result in abnormal or no-flow situations within such lines. Such condition could lead to over-pressurization or under-pressurization of the hydraulic lines within an irrigation system. Accordingly, it is envisioned that fluid flow, as discerned indirectly or from a flow sensor, can be included within the control functionality of Applicant's invention. More particularly, such flow characteristics within the irrigation system can be utilized to diagnose failure of a valve or delivery line by using the presently taught control system. In addition, the control system can be operative to regulate the valve according to flow during transitional periods of valve operation such as during start-up conditions or transitions between zones in the course of an irrigation.

Furthermore, it is understood that several different flow sensors can be utilized according to the system of the present invention. For example, one form of flow sensor comprises a vortex sensor. An alternative form of flow sensor comprises a paddlewheel that is interposed to communicate with fluid flow within a line of an irrigation system. One such paddlewheel further comprises a hard magnet placed on one of the paddlewheels and an electromagnetic sensor provided outside of the line which detects rotation of the paddlewheel via detection of the hard magnet on the paddlewheel. Accordingly, such paddlewheel can be calibrated to measure fluid flow within the line. Details of such flow sensors are readily understood within the art and further details are omitted herefrom in order to prevent obscuring details of the invention at hand.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fluid delivery and control system for a fluid delivery line, comprising:

a pressure sensor operative to detect fluid pressure oscillations within a fluid delivery line;

an electronically controlled valve comprising an adjustable flow regulating aperture having a variable outer diameter and disposed axially in the line along a linear flow axis, and operative to regulate fluid flow through the line;

processing circuitry communicating with the pressure sensor and the electronically controlled valve; and computer program code logic executed by the processing circuitry and configured to generate an output signal comprising an operating parameter of at least one of the pressure sensor and the electronically controlled valve to adjust flow capacity of the flow regulating aperture of the valve to actively dissipate the pressure oscillations within the fluid delivery line.

2. A fluid delivery and control system for a fluid delivery line, comprising:

a pressure sensor operative to detect fluid pressure within a fluid delivery line;

an electronically controlled valve comprising an adjustable flow regulating aperture, disposed in the line, interposed along a linear flow axis, and operative to regulate fluid flow through the line;

processing circuitry communicating with the pressure sensor and the electronically controlled valve; and computer program code logic executed by the processing circuitry and configured to generate an output signal comprising an operating parameter of at least one of the pressure sensor and the electronically controlled valve, the operating parameter including a pressure sampling interval that defines a sampling interval for the pressure sensor and the operating parameter operative to adjust flow capacity of the flow regulating aperture of the valve to dissipate pressure oscillations within the fluid delivery line.

3. The fluid delivery and control system of claim 1 wherein the operating parameter generated by the computer program code logic comprises a set point pressure for the electronically controlled valve.

4. A fluid delivery and control system for a fluid delivery line, comprising:

a pressure sensor operative to detect fluid pressure oscillations within a fluid delivery line;

an electronically controlled valve comprising an adjustable flow regulating aperture, disposed in the line, interposed along a linear flow axis, and operative to regulate fluid flow through the line;

processing circuitry communicating with the pressure sensor and the electronically controlled valve; and computer program code logic executed by the processing circuitry and configured to generate an output signal comprising an operating parameter of at least one of the pressure sensor and the electronically controlled valve to adjust flow capacity of the flow regulating aperture of the valve to dissipate pressure oscillations within the fluid delivery line;

wherein the operating parameter generated by the computer program code logic controllably regulates the electronically controlled valve to create a counter-oscillation of a fluid pressure oscillation detected with the sensor.

5. The fluid delivery and control system of claim 1 wherein the control circuitry comprises proportional integral derivative (PID) control.

6. The fluid delivery and control system of claim 1 wherein the pressure sensor is provided upstream of the electronically controlled valve.

7. The fluid delivery and control system of claim 1 wherein the pressure sensor is provided downstream of the electronically controlled valve.

8. The fluid delivery and control system of claim 1 wherein the electronically controlled valve comprises a boot valve, and further comprising a boot control volume line and a solenoid interposed in the line, wherein the solenoid is controllably operated by the control circuitry to regulate fluid pressure within a boot of the boot valve to controllably adjust a throttling element of the boot valve.

9. The fluid delivery and control system of claim 8 wherein the boot control volume line is provided between an upstream line of the valve and a boot volume of the boot valve.

10. The fluid delivery and control system of claim 8 wherein the boot control volume line is provided between a boot volume of the boot valve and a downstream vent.

11. The fluid delivery and control system of claim 10 wherein the downstream vent is vented to atmosphere.

12. The fluid delivery and control system of claim 1 further comprising a communication interface operative to adjustably configure the control circuitry.

13. The fluid delivery and control system of claim 1 wherein the control circuitry adjusts the electronically controlled valve to increase fluid pressure to a fluid flush operating point.

14. A fluid flow control system, comprising:
a pressure sensor to detect fluid pressure oscillations within a fluid delivery line;
an electronically controlled flow regulating valve having a central bore with a variable outer diameter, the bore provided in the line to impart a substantially linear fluid streamline through at least a portion of the central bore and operative to regulate fluid flow through the line; and
a processor communicating with the pressure sensor and the electronically controlled flow regulating valve, the sensor generating a PID feedback control signal; and
the processor operative to regulate fluid flow through the valve to mitigate fluid pressure oscillations in the line.

15. The control system of claim 14 comprising a plurality of electronically controlled valves, each controlled by the processor and operative to regulate fluid flow through respective lines of an irrigation system.

16. The control system of claim 14 wherein the fluid pressure oscillations result from non-steady state flow conditions within the line.

17. A fluid flow control system, comprising:
a pressure sensor to detect fluid pressure within a fluid delivery line;
an electronically controlled flow regulating valve provided in the line to impart a substantially linear flow axis and operative to regulate fluid flow through the line; and a processor communicating with the pressure sensor and the electronically controlled flow regulating valve, the sensor generating a PID feedback control signal;
wherein the processor is operative to regulate fluid flow through the valve to mitigate fluid pressure oscillations in the line and is further operative to adjust a sampling rate of the pressure sensor to a correction frequency that substantially negates detection of the fluid pressure oscillations.

18. A fluid flow control system, comprising:
a pressure sensor to detect fluid pressure within a fluid delivery line;
an electronically controlled flow regulating valve provided in the line to impart a substantially linear flow axis and operative to regulate fluid flow through the line; and
a processor communicating with the pressure sensor and the electronically controlled flow regulating valve, the sensor generating a PID feedback control signal;
wherein the processor is operative to regulate fluid flow through the valve to mitigate fluid pressure oscillations in the line and is further operative to discern an operating pressure base line about which fluid pressure oscillations occur, the processor operative to adjust a sampling frequency of the sensor that detects the pressure base line and mitigates the pressure oscillation so as to provide a feedback signal used to control the electronically controlled valve.

19. The control system of claim 14 wherein the processor is operative to adjust a set point pressure for the electronically controlled valve to an operating point that imparts stability to the system and balances fluid flow through the line.

20. A fluid flow control system, comprising:
a pressure sensor to detect fluid pressure within a fluid delivery line;
an electronically controlled flow regulating valve provided in the line to impart a substantially linear flow axis and operative to regulate fluid flow through the line; and
a processor communicating with the pressure sensor and the electronically controlled flow regulating valve, the sensor generating a PID feedback control signal;
wherein the processor is operative to regulate fluid flow through the valve to mitigate fluid pressure oscillations in the line and is further operative to detect the presence of a fluid pressure oscillation within the line and generate a substantially inverse oscillation that counteracts the detected fluid pressure oscillation so as to bring the system to a relatively stable operating point.

21. A fluid flow control system, comprising:
a pressure sensor to detect fluid pressure within a fluid delivery line;
an electronically controlled boot valve provided in the line to impart a substantially linear flow axis and operative to regulate fluid flow through the line;
at least one solenoid communicating between the fluid delivery line and a boot of the electronically controlled boot valve so as to adjustably control fluid flow to the electronically controlled boot valve boot;
a processor communicating with the pressure sensor and the electronically controlled boot valve, the sensor generating a PID feedback control signal; and
the processor operative to regulate fluid flow through the valve to mitigate fluid pressure oscillations in the line.

22. The control system of claim 14 wherein the processor is operative to controllably regulate operation of the electronically controlled valve to an elevated fluid pressure to a desired operating point in order to flush the line.

23. The control system of claim 14 wherein the pressure sensor and the processor cooperate to sustain a maximum fluid pressure condition, and the processing circuitry adjusts operation of the electronically controlled valve in response to the detected over-pressure condition to open the valve and discharge fluid therethrough to avoid over-pressurization of the system.

24. A fluid flow control system, comprising:
  a pressure sensor configured to detect fluid pressure within a primary fluid delivery line;
  a primary control valve including a boot valve provided in the primary fluid delivery line and operative to regulate fluid flow through the primary fluid delivery line;
  an auxiliary fluid delivery line extending between the primary control valve and the fluid delivery line and operative to deliver fluid between the primary control valve and the fluid delivery line to controllably adjust a throttling element of the primary control valve;
  an auxiliary control valve including a solenoid interposed in the auxiliary fluid delivery line and operative to regulate fluid flow through the auxiliary fluid delivery line; and
  a processor communicating with the pressure sensor and the auxiliary control valve;
  the processor operative to controllably adjust the throttling element of the primary control valve by regulating operation of the auxiliary control valve to deliver fluid between the primary control valve and the fluid delivery line via the auxiliary fluid delivery line.

25. The control system of claim 24 wherein the auxiliary fluid delivery line extends between the boot valve and the primary fluid delivery line upstream of the boot valve.

26. The control system of claim 24 wherein the auxiliary fluid delivery line extends between the boot valve and the primary fluid delivery line downstream of the boot valve.

27. The control system of claim 24 wherein a first auxiliary fluid delivery line extends between the boot valve and the primary fluid delivery line upstream of the boot valve, and a second auxiliary fluid delivery line extends between the boot valve and a downstream vent, wherein the boot valve further comprises a boot volume with which the first auxiliary fluid delivery line and the second auxiliary fluid delivery line communicate so as to controllably adjust a fluid flow orifice of the boot valve.

28. A method for controlling pressure oscillations within fluid of a fluid delivery line, comprising:
  providing an electronically controlled, flow regulating valve disposed within a fluid delivery line having a central bore axially aligned with the fluid delivery line for passage of fluid through the valve and a pressure sensor communicating with the fluid delivery line;
  detecting fluid pressure oscillations within the fluid delivery line using the pressure sensor; and
  generating a PID feedback control signal from the pressure sensor indicative of detected fluid pressure oscillations; and
  controllably regulating the electronic valve in response to the PID feedback control signal to dissipate the fluid pressure oscillations in the fluid delivery line.

29. The method of claim 28 wherein the pressure sensor is provided upstream of the electronically controlled valve.

30. The method of claim 28 wherein the pressure sensor is provided downstream of the electronically controlled valve.

31. The method of claim 28 wherein controllably regulating the electronic valve comprises controllably generating an output signal including an operating parameter of at least one of the pressure sensor and the electronic valve to adjust fluid flow through the valve so as to dissipate pressure oscillations within the fluid delivery line.

32. The method of claim 31, wherein controllably generating an output signal comprises controllably generating an operating parameter comprising a pressure sampling interval that defines a sampling interval for the pressure sensor.

33. The method of claim 31 wherein controllably generating an output signal comprises generating an operating parameter comprising a set point pressure for the electronic valve.

34. The method of claim 31 wherein controllably generating an output signal comprises generating an operating parameter that controllably regulates the electronic valve to create a counter-oscillation that substantially counteracts a fluid pressure oscillation detected by the sensor.

35. The method of claim 31 wherein controllably regulating comprises implementing proportional integral derivative (PID) control.

* * * * *

UNITED STATES PATENT AND TRADEMARK OFFICE
CERTIFICATE OF CORRECTION

PATENT NO. : 6,568,416 B2
DATED : May 27, 2003
INVENTOR(S) : Jeffrey C. Tucker et al.

It is certified that error appears in the above-identified patent and that said Letters Patent is hereby corrected as shown below:

Column 9,
Line 35, delete "a purely axially line" and insert -- a purely axial line --.

Column 16,
Lines 22-23, delete "upstream pressure, $P_{UP}$, downstream pressure response $P_{DOWN}$ is substantially uniform" and insert -- upstream pressure, $P_{UP}$, and downstream pressure response $P_{DOWN}$ were substantially uniform --.

Column 17,
Line 5, delete "downstream pressure $P_{DOWN}$ drifts overtime", and insert -- downstream pressure $P_{DOWN}$ drifts over time --.

Column 18,
Line 35, delete "Nelson 800 Series control valve, of Nelson Irrigation" and insert -- Nelson 800 Series control valve, from Nelson Irrigation --.

Signed and Sealed this

Ninth Day of September, 2003

JAMES E. ROGAN
*Director of the United States Patent and Trademark Office*